(12) United States Patent
Teranishi

(10) Patent No.: US 8,028,171 B2
(45) Date of Patent: Sep. 27, 2011

(54) SIGNATURE APPARATUS, VERIFYING APPARATUS, PROVING APPARATUS, ENCRYPTING APPARATUS, AND DECRYPTING APPARATUS

(75) Inventor: Isamu Teranishi, Tokyo (JP)

(73) Assignee: NEC Corporation, Tokyo (JP)

( * ) Notice: Subject to any disclaimer, the term of this patent is extended or adjusted under 35 U.S.C. 154(b) by 1103 days.

(21) Appl. No.: 11/795,616

(22) PCT Filed: Dec. 13, 2005

(86) PCT No.: PCT/JP2005/022875
§ 371 (c)(1),
(2), (4) Date: Jul. 19, 2007

(87) PCT Pub. No.: WO2006/077701
PCT Pub. Date: Jul. 27, 2006

(65) Prior Publication Data
US 2008/0301449 A1    Dec. 4, 2008

(30) Foreign Application Priority Data
Jan. 21, 2005    (JP) .................................. 2005-014891

(51) Int. Cl.
H04L 9/32    (2006.01)
(52) U.S. Cl. ........................... 713/180; 713/176; 380/28
(58) Field of Classification Search .................. 713/168, 713/176, 180, 181; 380/28–30
See application file for complete search history.

(56) References Cited

U.S. PATENT DOCUMENTS
6,651,167 B1    11/2003    Terao et al.

FOREIGN PATENT DOCUMENTS
JP    11-119649    4/1999
JP    2001-134178 A    5/2001

OTHER PUBLICATIONS

Eu-Jin Goh et al., A Signature Scheme as Secure as the Diffie-Hellman Problem, XP-002332179, http:/theory.lcs.mit.edu/stasio/Papers/gj03.pdf>, retrieved Jun. 16, 2005, 16 pages.
Jonathan Katz et al., Efficiency Improvements for Signature Schemes with Tight Security Reductions, XP-002585192, Proceedings of the 10th ACM Conference on Computer and Communications Security, 2003, 10 pages.
M. Bellare et al., "Random Oracles are Practical: A Paradigm for Designing Efficient Protocols," ACM-CCS., 1993, pp. 62-73.

(Continued)

*Primary Examiner* — Nirav B Patel
(74) *Attorney, Agent, or Firm* — Foley & Lardner LLP

(57) ABSTRACT

Provided are a signature apparatus, a verifying apparatus, a proving apparatus, an encrypting apparatus, and a decrypting apparatus capable of efficiently reducing a signature text counterfeit problem to a discrete logarithm problem. The commitment is a hash value of a set of a value to be committed. Data including a pair of elements of a cyclic group associated with a discrete logarithm problem is used as a public key, and a discrete logarithm of an order of the pair is used as a secret key. Accordingly, it is possible to summarize secret information of an attacker from the commitment without rewinding the attacker and to ensure a higher safety than that of a Schnorr signature scheme. In addition, one-time power residue calculation is performed in each of the signature and verification calculations, so that it is possible to lower an amount of calculation in the signature and verification calculations.

34 Claims, 14 Drawing Sheets

OTHER PUBLICATIONS

M. Bellare et al., "The Exact Security of Digital Signature—How to Sign with RSA and Rabin," Advances in Cryptology, Eurocrypt 1996, vol. 1070 of LNCS, pp. 399-416, Springer-Verlag.

J-S. Coron, "On the Exact Security of Full Domain Hash," Advances in Cryptology, Crypto 2000, vol. 1880 of LNCS, pp. 229-235, Springer-Verlag.

A. Fiat et al., "How to Prove Yourself: Practical Solutions to Identification and Signature Problems," Advances in Cryptology, Crypto 1986, vol. 263 of LNCS, pp. 186-194, Springer-Verlag.

E-J Goh et al., "A Signature Scheme as Secure as the Diffie-Hellman Problem," Advances in Cryptology, Eurocrypt 2003, vol. 2656 of LNCS, pp. 401-415.

K. Ohta et al., "On Concrete Security Treatment of Signatures Derived from Identification," Advances in Cryptology, Crypto 1998, vol. 1462 of LNCS, pp. 354-369, Springer-Verlag.

R. Pass, "On Deniability in the Common Reference String and Random Oracle Model," Advances in Cryptology, Crypto 2003, vol. 2729 of LNCS, pp. 316-337, Springer-Verlag.

D. Pointcheval et al., "Security Arguments for Digital Signatures and Blind Signatures," Journal of Crytpology, vol. 13, 2000, pp. 1-25, Springer-Verlag.

A Menezes et al., "Handbook of Applied Cryptology," CRC Press, Dec. 16, 1996, pp. 135-154.

A Menezes et al., "Handbook of Applied Cryptology," CRC Press, Dec. 16, 1996, pp. 592-599.

A Menezes et al., "Handbook of Applied Cryptology," CRC Press, Dec. 16, 1996, pp. 459-460.

R.L. Rivest et al., "A Method for Obtaining Digital Signatures and Public-Key Cryptosystems," Communications of the ACM. vol. 21, No. 2, 1978, pp. 1-15.

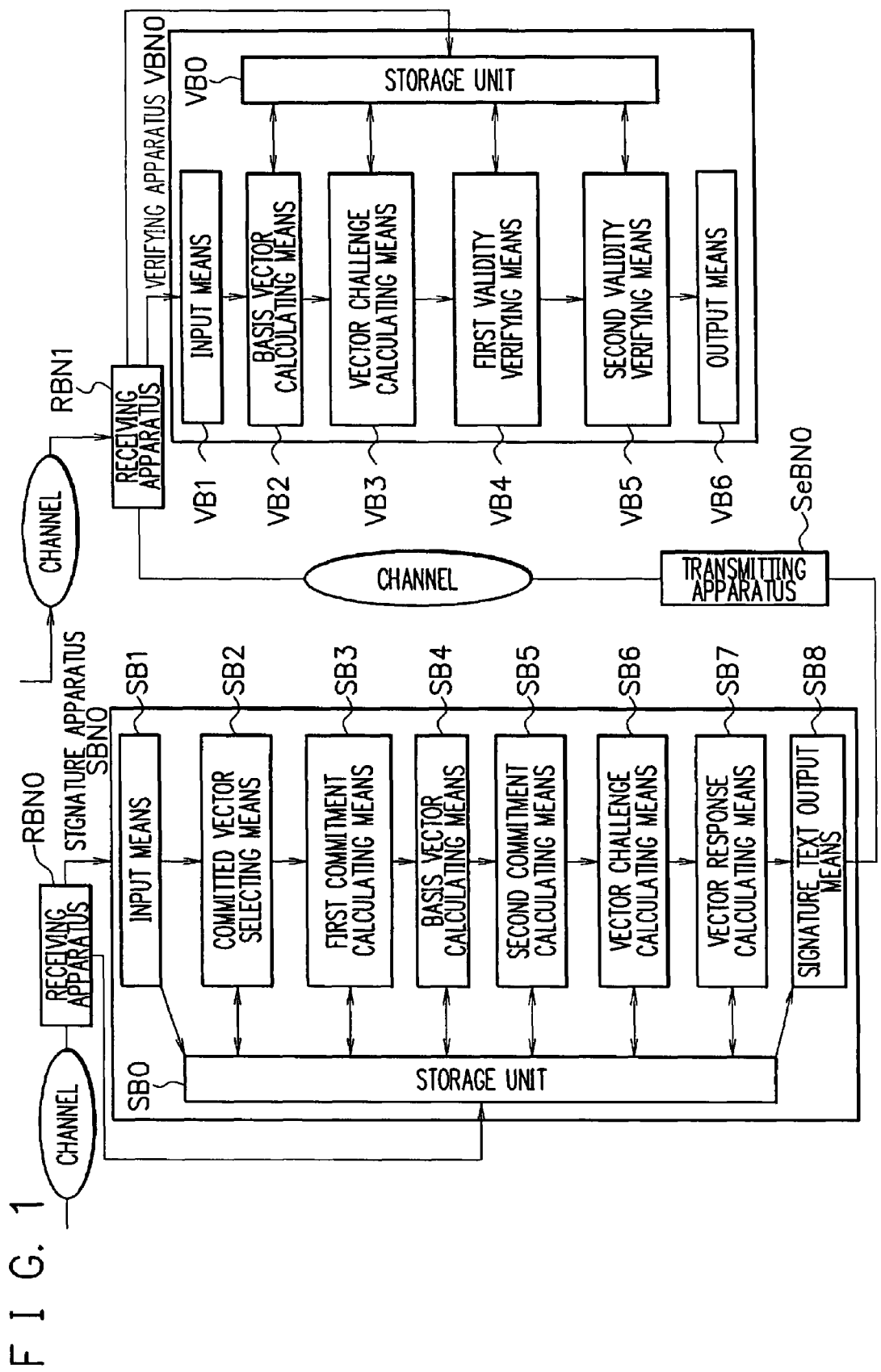
F I G. 1

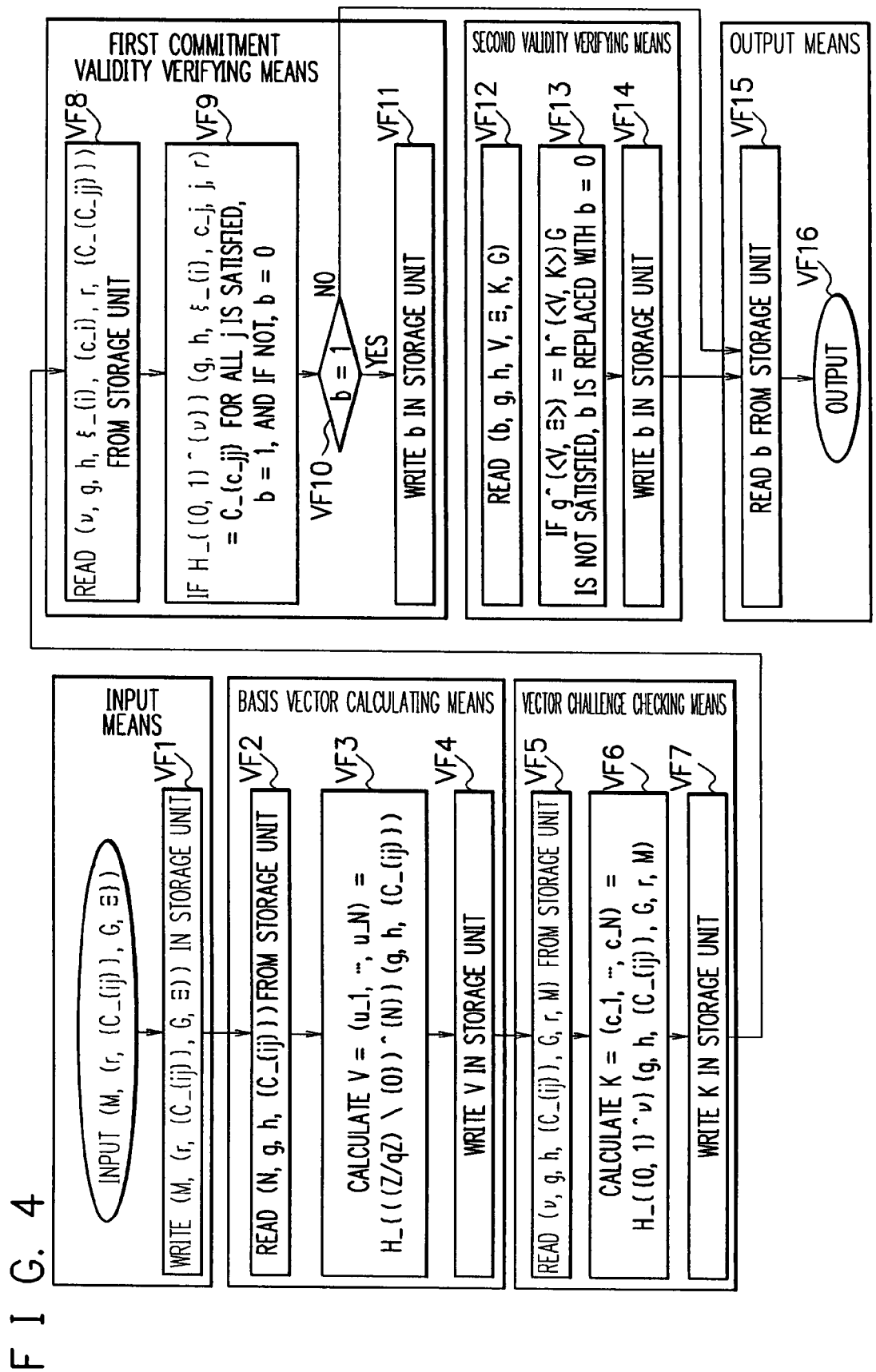
F I G. 4

FIG. 7
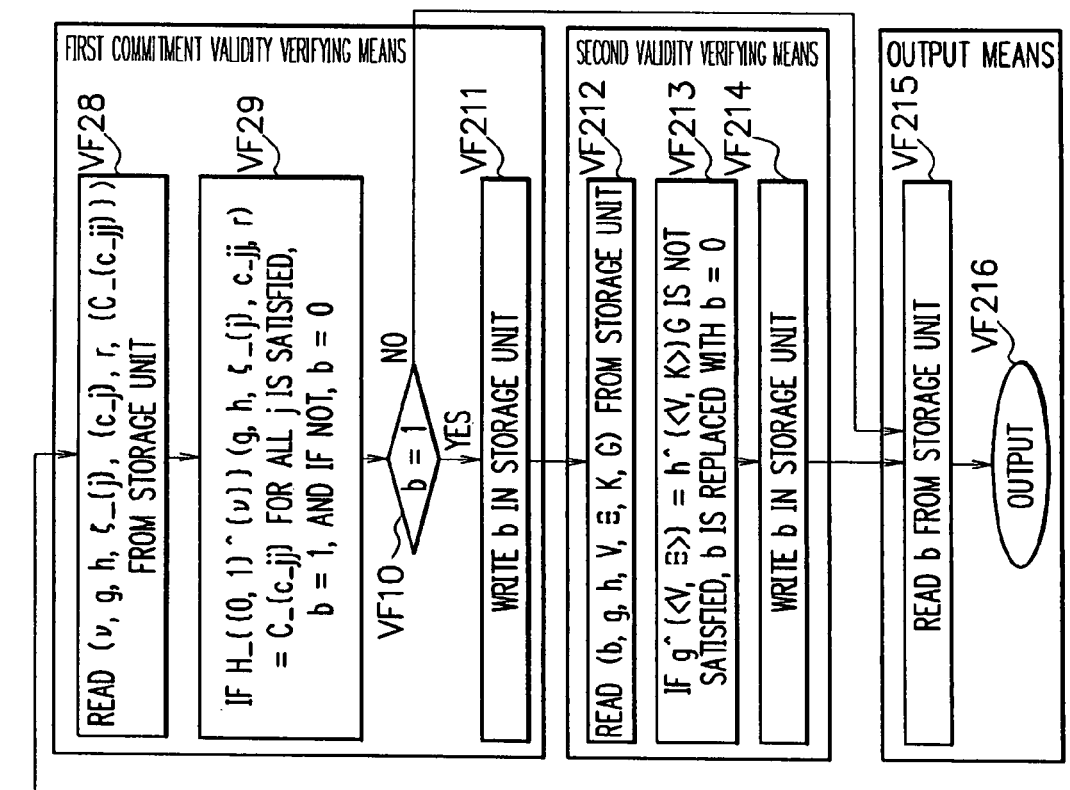
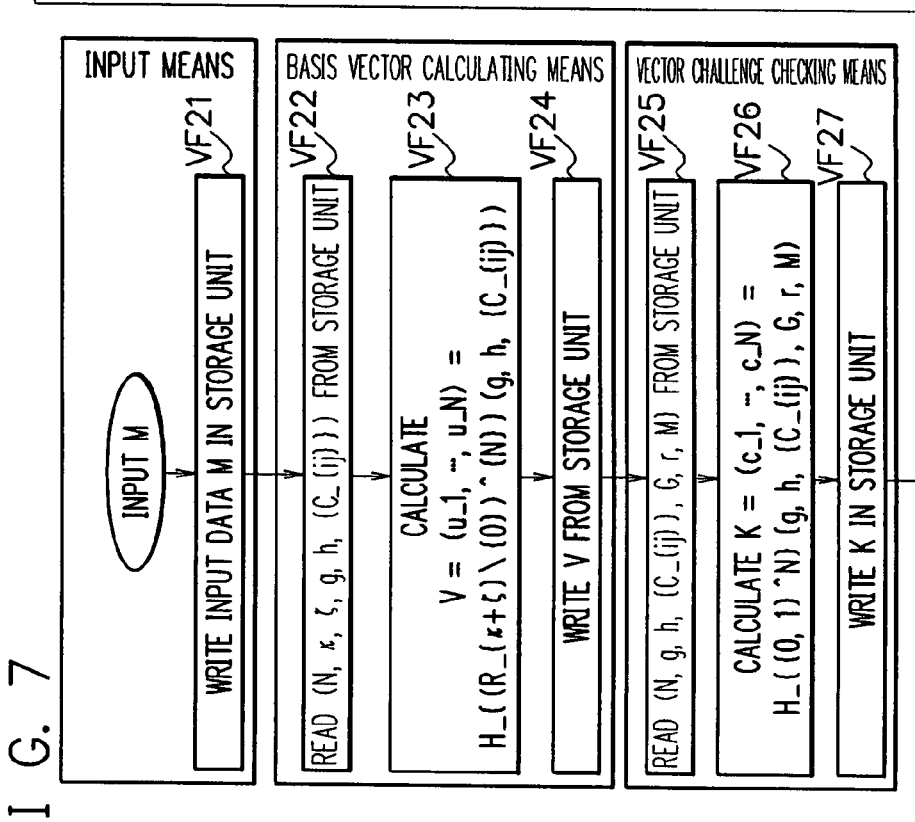

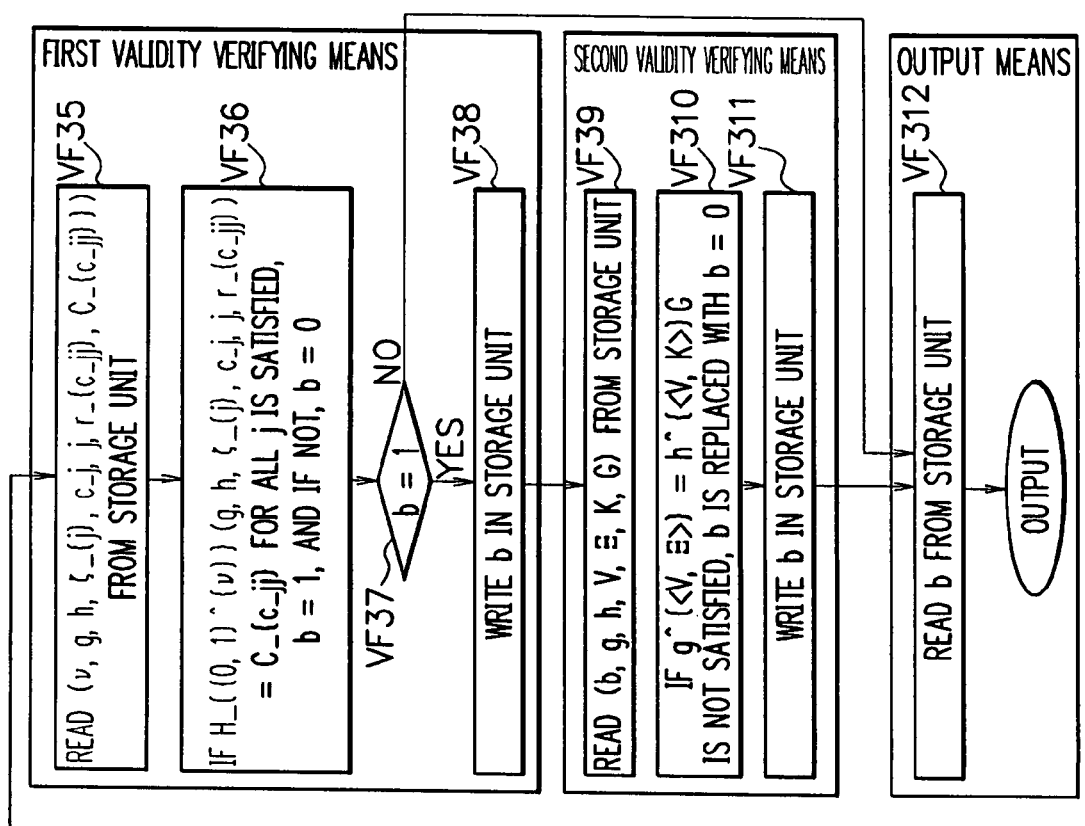
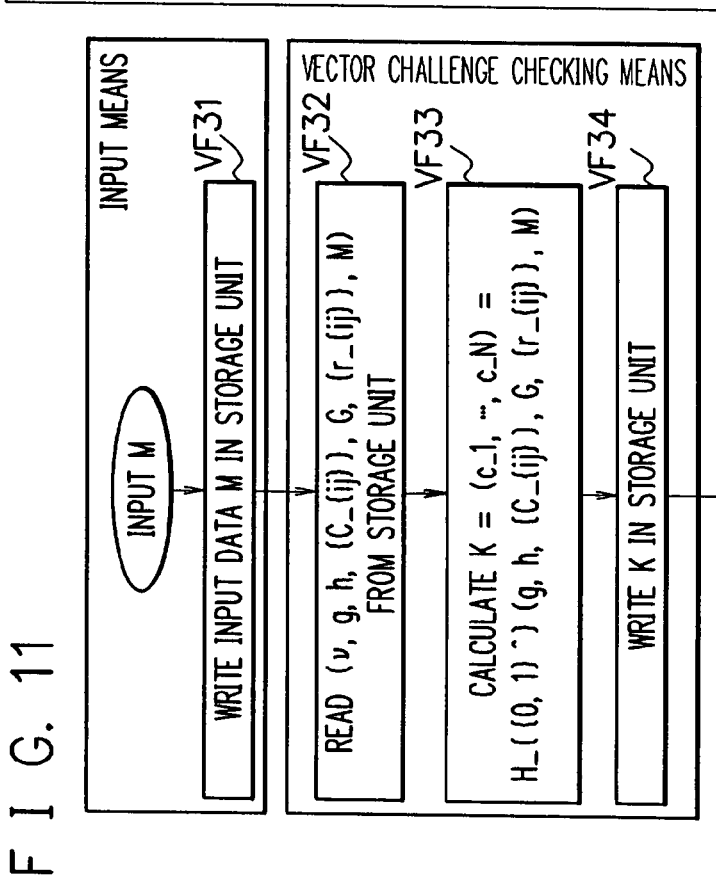
F I G. 11

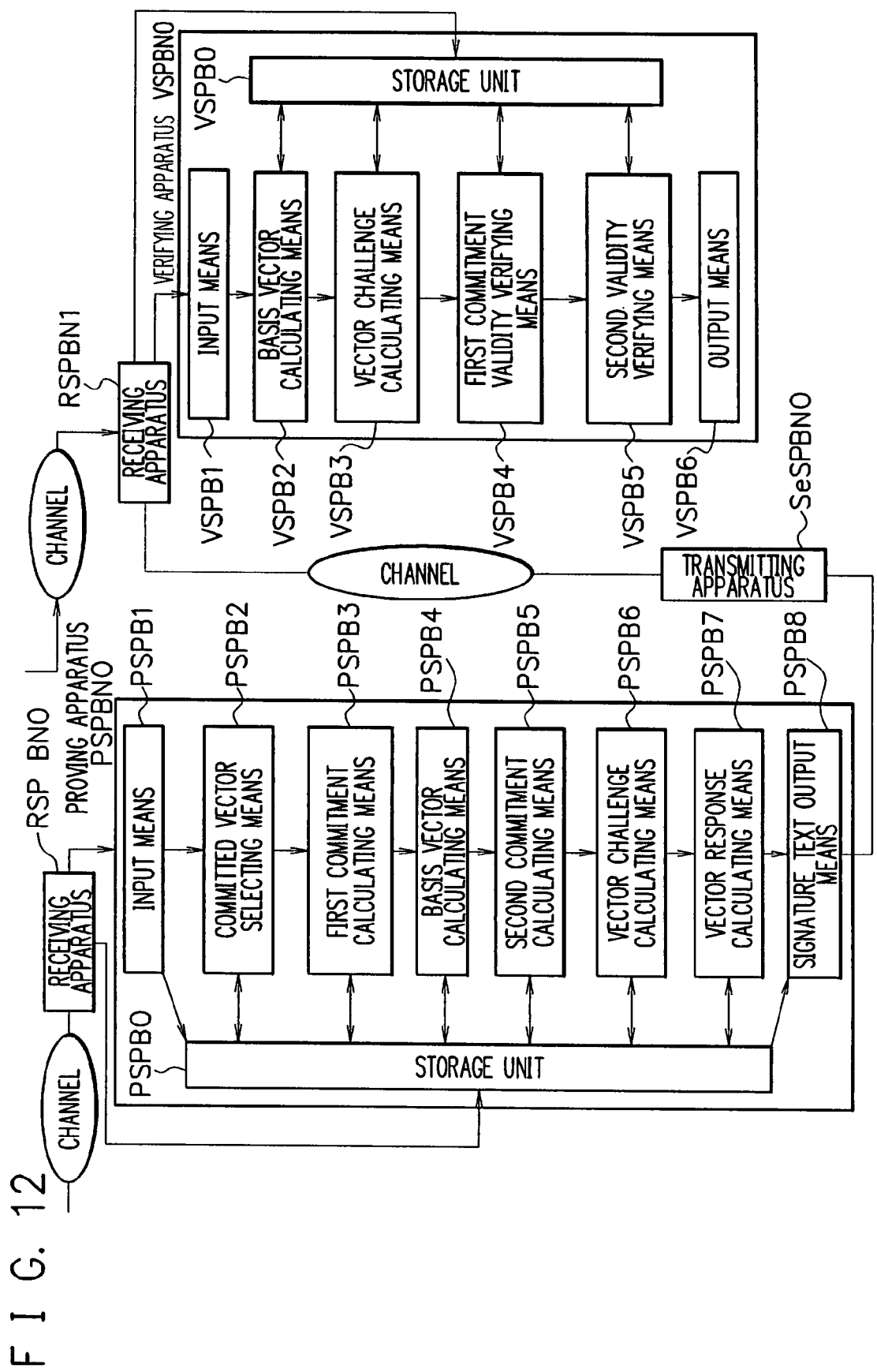
F I G. 12

SIGNATURE APPARATUS, VERIFYING APPARATUS, PROVING APPARATUS, ENCRYPTING APPARATUS, AND DECRYPTING APPARATUS

This application is the National Phase of PCT/JP2005/022875, filed Dec. 13, 2005, which claims priority to Japanese Application No. 2005-014891, filed Jan. 12, 2005, the disclosures of which are hereby incorporated by reference in their entirety.

1. Technical Field

The present invention relates to a signature apparatus, a verifying apparatus, a proving apparatus, an encrypting apparatus, and a decrypting apparatus and, more particularly, to a signature apparatus, a verifying apparatus, a proving apparatus, an encrypting apparatus, and a decrypting apparatus capable of efficiently reducing a signature text counterfeit problem to a discrete logarithm problem.

2. Background Art

A public key is a cipher which uses different keys for encrypting and decrypting. The key used for the decrypting is maintained in a secret state, while the key used for the encrypting is publicized. The public key needs a system for ensuring an authenticity of a key to be publicized. However, there is no need to distribute the key to a counter party in advance. In addition, due to the public key, it is possible to implement a digital signature capable of authenticating the counter party for communication and verifying the authenticity of received data. For this reason, the public key is widely used as an information security technique in a network such as the Internet.

Recently, a crypto scheme having a provable safety and a practicability has been widely researched with respect to the public key. Among the current used crypto schemes, an efficient decryption method has not yet been implemented, and safety of most crypto schemes has not been proven. A probability of presence of the efficient decryption methods associated with the crypto schemes can not completely be denied.

Non-Patent Document 1: Mihir. Bellare and Phillip. Rogaway. Random Oracles are Practical: A Paradigm for Designing Efficient Protocols. ACM-CCS. 1993. pp. 62-73

Non-Patent Document 2: Mihir Bellare, Phillip Rogaway. The Exact Security of Digital Signatures: How to Sign with RSA and Rabin. In Advances in Cryptology—EUROCRYPT' 96, vol. 1070 of LNCS, pp. 399-416, Springer-Verlag, 1996.

Non-Patent Document 3: Jean-Sebastien Coron. On the Exact Security of Full Domain Hash. In Advances in Cryptology—CRYPTO 2000, vol. 1880 of LNCS, pp. 229-235, Springer Verlag, 2000.

Non-Patent Document 4: Amos. Fiat and Adi. Shamir. How to prove yourself: Practical Solution to Identification and Signature Problems. In Advances in Cryptology—CRYPTO' 86, vol. 263 of LNCS pp. 186-194, Springer-Verlag, 1987.

Non-Patent Document 5: Eu-Jin Goh, Stanislaw Jarecki. A Signature Scheme as Secure as the Diffie-Hellman Problem. In Advances in Cryptology—EUROCRYPT 2003, vol. 2656 of LNCS, pp. 401-415, Springer-Verlag, 2003.

Non-Patent Document 6: Kazuo Ohta, Tatsuaki Okamoto. On Concrete Security Treatment of Signatures Derived from Identification. In Advances in Cryptology—CRYPTO' 98, vol. 1462 of LNCS, pp. 354-369, Springer-Verlag, 1998.

Non-Patent Document 7: Rafael Pass. On Deniability in the Common Reference String and Random Oracle Model. In Advances in Cryptology—CRYPTO 2003, vol. 2729 of LNCS pp. 316-337, Springer Verlag, 2003.

Non-Patent Document 8: David Pointcheval, Jacques Stern: Security Arguments for Digital Signatures and Blind Signatures. J. Cryptology 13(3): 361-396 (2000)

Non-Patent Document 9: R. Rivest, A. Shamir, L. Adleman. A Method for Obtaining Digital Signatures and Public-Key Cryptosystems. Communications of the ACM. Vol. 21, No. 2, pp. 120-126, 1978.

Non-Patent Document 10: C. Schnorr. Efficient Signature Generation by Smart Cards. Journal of Cryptology, 4(3), pp. 161-174, 1991.

Non-Patent Document 11: Handbook of Applied Cryptography. A. Menezes P. Oorshot, and S. Vanstone, CRC Press.

Non-Patent Document 12: Rafael Pass. On Deniability in the Common Reference String and Random Oracle Model. In Advances in Cryptology—CRYPTO 2003, vol. 2729 of LNCS, pp. 316-337, Springer-Verlag, 2003.

Non-Patent Document 13: Markus Jakobsson, Kazue Sako, and Russell Impagliazzo. Designated Verifier Proofs and Their Applications. In Advances in Cryptology—EUROCRYPT' 96, vol. 1070 of LNCS, pp. 143-154, Springer-Verlag, 1996.

DISCLOSURE OF THE INVENTION

Problems to be Solved by the Invention

However, the aforementioned schemes have the following problems.

Since an electronic signature scheme was disclosed in Non-Patent Document 9, implementation of a safe and efficient signature scheme has been one of the objects of a cryptology. As approaches for achieving the object, there are signature schemes using Fiat-Shamir heuristic (Non-Patent Document 4) or a hash-then-sign method (Non-Patent Document 1).

However, in terms of safety proof (Non-Patent Documents 3, 6, and 8) of the signature schemes, it is disclosed that a signature text cannot be counterfeited during a polynomial time interval while it is not disclosed in detail how much amount of calculation is needed to counterfeit the signature text. For this reason, there is a probability of presence of an attacker who can succeed counterfeiting the signature text with a much smaller amount of calculation than the amount of calculation required for decrypting a base problem (Non-Patent Document 2).

The Schnorr signature scheme (Non-Patent Document 10) is one of the signature schemes having such a probability. Although the base problem, that is, a discrete logarithm problem has a safety of about $\lambda$ bits, the safety proof (Non-Patent Documents 6 and 8) of the Schnorr signature scheme ensures that the Schnorr signature scheme has at most a safety of about $\lambda/2$ bits. Therefore, a signature scheme capable of efficiently reducing the signature text counterfeit problem to the discrete logarithm problem is required.

It is known that a scheme having such a property can be theoretically implemented. As a scheme satisfying the property, there is a scheme of converting to a cut-and-choose type proving scheme (Non-Patent Document 7) of the discrete logarithm problem. However, the scheme needs a large amount of calculation for signature and verification. It is disclosed that a signature scheme capable of efficiently reducing the signature text counterfeit problem to the discrete logarithm problem and using a small amount of calculation cannot be implemented (Non-Patent Document 5).

In Non-Patent Document 2, since there is a need to rewind an attacker during the safety proof, an efficiency of reduction to the base problem is deteriorated, so that the safety is deteriorated compared with the base problem. In the safety proof ¥cite[PS00] of the Schnorr signature scheme, since there is a need to rewind the attacker, the safety is deteriorated compared with the base problem, that is, the discrete logarithm problem.

Therefore, an object of the present invention is to provide a signature apparatus, a verifying apparatus, a proving apparatus, an encrypting apparatus, and a decrypting apparatus capable of summarizing secret information of an attacker from a commitment without rewinding the attacker by using a hash value as the commitment.

Means for Solving the Problems

Various embodiments provide a signature apparatus for generating a signature text by using a commitment, wherein the commitment is a hash value of a set including a committed value, data including a pair of elements of a cyclic group associated with a discrete logarithm problem is used as a public key, and a discrete logarithm of an order of the pair is used as a secret key.

Various embodiments also provide a signature apparatus for generating a signature text by using a commitment, wherein the commitment is a hash value of a set including a value to be committed, data including a pair of elements of a cyclic group associated with a discrete logarithm problem is used as a public key, and a discrete logarithm of an order of the pair is used as a secret key, the signature apparatus comprising: committed vector selecting means which selects a committed vector associated with a first commitment; first commitment calculating means which calculates the first commitment; basis vector calculating means which calculates a basis vector; second commitment calculating means which calculates the power residue and calculates a second commitment; vector challenge calculating means which calculates a vector challenge; vector response calculating means which calculates a vector response by using the first commitment, a set used for calculating the power residue, the vector challenge, and the basis vector; and a storage unit which stores the committed vector, the first commitment, the basis vector, the second commitment, the vector challenge, and the vector response, wherein the basis vector and the vector challenge are hash values.

In a representative embodiment, the committed vector selecting means selects a plurality of the committed vectors, each component of the plurality of committed vectors and a secret key satisfy a relation equation with a group order as a modulus, and the set is data calculated by using a portion of data selected by the committed vector selecting means, the basis vector, and the vector challenge.

In some embodiments each component of the committed vectors and the secret key satisfy a linear equation with the group order as a modulus, an input of the first commitment is data including a random number, a portion of the data is determined by the vector challenge, and the set is represented by a linear equation of the portion of the data and the basis vector.

In various embodiments the committed vector includes two components, the one component being a value obtained by adding a secret key to the other component and obtaining a residue with a group order as a modulus, an input of the first commitment includes data for specifying each component of the committed vector, and the set includes a inner product of the portion of the data and the basis vector.

In one embodiment, assuming that security parameters are $\kappa$, $N$, and $\nu$, and an order of the cyclic group is $q$, the committed vector selecting means selects a residue group $X\_\{01\}, \ldots, X\_\{0N\} \in (Z/qZ)$ at random and sets values obtained by adding $x$ to the residue group $X\_\{0j\}$ for $j=1, \ldots N$ and obtaining a residue with the order $q$ as a modulus to $X\_\{1j\}$, the committed vector for $i=0, 1$ is $Y\_i = (X\_\{i1\}, \ldots, X\_\{iN\})$, the first commitment calculating means selects at random a bit column $r$ of $\nu$ bits, a hash value of data including the public key, $X\_\{ij\}$, $i$, $j$, $r$ for $i=0, 1$ is set to the first commitment $C\_\{ij\}$, the basis vector calculating means sets a hash value of data including the public key and the first commitment $C\_\{ij\}$ to the basis vector $V=(u\_1, \ldots, u\_N)$, the second commitment calculating means calculates an inner product of the basis vector $V$ and the $Y\_0$ and calculates a second commitment $G=g^\{X\}$, the vector challenge calculating means calculates a hash value $K=(c\_1, \ldots, c\_N)$ of data including the public key, $C\_\{ij\}\}$, $G$, $r$, and a message received by the signature apparatus, the vector response calculating means calculates the vector response $\xi\{j\}=X\_\{c\_jj\}\}$ for all $j=1, \ldots, N$ and $\Xi=(\xi\_1, \ldots, \xi\_\kappa)$ and a signature text $(r, \{C\_\{ij\}\}, G, \Xi)$ is output.

In other embodiments, committed vector selecting means selects the plurality of committed vectors, and each component of the plurality of committed vectors and a secret key satisfy a relational equation.

In a suitable embodiment, the relational equation satisfies a linear equation of each component of the plurality of vectors and the secret key, and an input of the first commitment is data including a random number.

In some embodiments, the plurality of committed vectors include a plurality of components, the one component is obtained by adding a secret key to another component, and an input of the first commitment includes data for specifying each of the components and data for specifying which is the ordinal number of the component.

In an exemplary embodiment, assuming that security parameters are $\kappa$, $N$, and $\nu$, and an integer set $R\{\kappa+\xi\}$ satisfies $0 \geq R\{\kappa+\xi\} < 2^\{\kappa+\xi\}$, the committed vector selecting means selects a residue group $X\_\{01\}, \ldots, X\_\{0N\} \in (Z/qZ)$ at random and sets values obtained by adding $x$ to the residue group $X\_\{0j\}$ for $j=1, \ldots N$ to $X\_\{1j\}$, the committed vector for $i=0, 1$ is $Y\_i = (X\_\{i1\}, \ldots, X\_\{iN\})$, the first commitment calculating means selects at random a bit column $r$ of $\nu$ bits, a hash value of data including the public key, $X\_\{1j\}$, $i$, $j$, $r$ for $i=0, 1$ is set to the first commitment $C\_\{ij\}$, the basis vector calculating means sets a hash value of data including the public key and the first commitment $C\_\{ij\}$ to the basis vector $V=(u\_1, \ldots, u\_N)$, the second commitment calculating means calculates an inner product of the basis vector $V$ and the $Y\_0$ and calculates a second commitment $G=g^\{X\}$, the vector challenge calculating means calculates a hash value $K=(c\_1, c\_N)$ of data including the public key, $\{C\_\{ij\}\}$, $G$, $r$, and a message received by the signature apparatus, the vector response calculating means calculates the vector response $\xi\_\{j\}=X\_\{c\_jj\}$ for all $j=1, \ldots, N$ and $\Xi=(\xi\_1, \ldots, \xi\_\kappa)$, and a signature text $(r, \{C\_\{ij\}\}, G, \Xi)$ is output.

In another embodiment, the signature apparatus comprises the committed vector selecting means which selects a committed vector associated with a first commitment; first commitment calculating means which calculates the first commitment; basis vector calculating means which calculates a basis vector; second commitment calculating means which calculates the power residue and generates a second commitment; vector challenge calculating means which calculates a vector challenge; vector response calculating means which calculates a vector response by using the first commitment, a set used for calculating the power residue, the vector challenge, and the basis vector; and a storage unit which stores the committed vector, the first commitment, the basis vector, the second commitment, the vector challenge, and the vector response, wherein the basis vector and the vector challenge are hash values.

In various embodiments, the committed vector selecting means selects a plurality of the committed vectors, each having the same configuration as the committed vector, each component of the plurality of committed vectors and a secret key satisfy a relation equation with a group order as a modulus, and the set is data calculated by using a portion of data selected by the committed vector selecting means, the basis vector, and the vector challenge.

In a representative embodiment each component of the committed vectors and the secret key satisfy a linear equation with the group order as a modulus, the first commitment is data including a random number, a portion of the data is determined by the vector challenge, and the set is represented by a linear equation of the portion of the data and the basis vector.

In some embodiments the one component of the committed vector is a value obtained by adding a secret key to another component and obtaining a residue with a group order as a modulus, the set includes an inner product of the portion of the data and the basis vector, and the basis vector is a value obtained by multiplying a predetermined number t with $(1, t^1, t^2, \ldots, t^N)$.

In exemplary embodiments assuming that the message is M, the committed vector selecting means selects at random $Y\_0=(X\_\{01\}, \ldots, X\_\{0N\}) \in Zq^\{N\}$, calculates $X\_\{1j\}=x+X\_\{0j\}$ modq for $j=1, \ldots, N$, and generates the committed vector $Y\_1=(X\_\{11\}, \ldots X\_\{1N\})$, the second commitment calculating means calculates $X=<\{Y\_0, V\}>=\Sigma\_j X\_\{0j\}2^\{j-1\}$ modq and calculates the commitment $G=g^\{X\}$, the first commitment calculating means selects at random $r\_\{ij\} \in \{0,1\}^\{v\}$ for each i and j and calculates the first commitment $C\_\{ij\}=H\_\{\{0,1\}^v\}(X\_\{ij\}, r\_\{ij\})$ of the $X\_\{ij\}$, the vector challenge calculating means calculates $K=(c\_\{1\}, \ldots, c\_\{N\})=H\_\{\{0,1\}^\{N\}\}(g, h, \{C\_\{ij\}\}, G, M)$, the vector response calculating means calculates the vector response $\xi\_j=X\_\{c\_{jj}\}$ modq for each j and calculates $\Xi=\xi\_\{1\}, \ldots, \xi\_\{N\})$, and a signature text $(\{C\_\{ij\}\}, \{r\_\{c\_jj\}\}, G, \Xi)$ is output.

Various embodiments provide a verifying apparatus for determining a validity of input data, wherein the input data includes a message and a signature text associated with the message; only if the data is valid, the data is accepted, first commitments are used for verification calculation, and power residue is performed the number of times less than the number of the first commitments; if the validity of the data is authenticated, the first commitments are hash values of data including components of a vector response which is a portion of the data; a public key is data including a pair of elements of a cyclic group associated with a discrete logarithm problem; and a secret key is a discrete logarithm of an order of the pair.

Some embodiments provide a basis vector calculating means which calculates a basis vector; vector challenge calculating means which calculates a vector challenge; first commitment validity verifying means which determines a validity of the first commitment; second validity verifying means which calculates power residue and determines a validity of the vector response; and storage means which stores data input to and output from each of the means, wherein the vector challenge and the basis vector are hash values, and, only if the first commitment validity verifying means and the second validity verifying means determine that the signature text is valid, the input of the data is accepted.

In various embodiments the first commitment validity verifying means inputs a portion of the input data including the vector response to a hash function in a predetermined method and determines that the first commitment is valid only if the calculated hash value is equal to the first commitment, when the to-be-determined data include data called a second commitment and the vector response and the public key includes two elements of a cyclic group associated with a discrete logarithm problem, the second validity verifying means calculates first and second power residues which are power residues of the elements and determines whether or not the first power residue is equal to a value obtained by multiplying the second power residue with the second commitment, the first power residue is obtained by designating elements which are a portion of the public key to an order and designating a Schnorr challenge to a set, the second power residue is obtained by designating elements which are a portion of the public key to an order and designating a Schnorr response to a set, the Schnorr challenge is data calculated by using the vector challenge and the basis vector, and the Schnorr response is data calculated by using the vector response and the basis vector.

In exemplary embodiments if a valid signature text is not included in data validly selected at random by the signature apparatus, the data is not accepted, the data selected at random is input to each hash function calculated by the first commitment validity verifying means, one component of the vector response is input to each of the hash functions, the Schnorr challenge is a linear equation of the vector challenge and a linear equation of the basis vector, and the Schnorr response is a linear equation of the vector response and a linear equation of the basis vector.

In representative embodiments the Schnorr challenge is an inner product of the vector challenge and the basis vector, and the Schnorr response is an inner product of the vector response and the basis vector.

In an exemplary embodiment, assuming that the message is M, and the to-be-determined data is $(r, \{C\_\{ij\}\}, G, \Xi)$, the basis vector calculating means calculates a hash value of data including the public key and $\{C\_\{ij\}\}$, the hash value being the basis vector $V=(u\_1, \ldots, u\_N)$, the vector challenge calculating means calculates a hash value of data including the public key, $\{C\_\{ij\}\}, G, r$, and M, the hash value being the vector challenge $K=(c\_1, \ldots, c\_N)$, the first commitment validity verifying means determines that $C\_\{c\_jj\}$ is valid only if $C\_\{c\_jj\}$ for $j=1, \ldots, N$ are equal to the ash function determines that $\{C\_\{ij\}\}$ is valid only if all the $C\_\{c\_jj\}$ are valid, the hash function is a hash value of data including the public key, $\xi\_\{j\}, c\_j, j$, and r, and the second validity verifying means determines whether or not $g^\{<V, \Xi>\}=h^\{<V, K>\}G$ is satisfied and determines that the signature text is valid if $g^\{<V, \Xi>\}=h^\{<V, K>\}G$ is satisfied.

A suitable embodiment vector challenge calculating means which calculates the vector challenge; first commitment validity verifying means which determines a validity of the first commitment; and second validity verifying means which calculates the power residue and determines a validity of the vector response, wherein the signature text is accepted only if the validity is authenticated in the first commitment validity verifying means and the second validity verifying means.

In some embodiments, if a hash value obtained by inputting a portion of the input data to a hash function is equal to the first commitment, the first commitment validity verifying means determines that the first commitment is valid, the data input to the hash function is used to calculate two power residues, and it is determined whether or not the one of the two power residues is equal to a value obtained by multiplying the other power residue with the second commitment, the to-be-determined data includes the second commitment and the vector response, the public key includes elements of a cyclic group associated with a discrete logarithm problem, each of the power residues is obtained by designating the other element which is a portion of the public key to an order and designating a Schnorr challenge to a set, the Schnorr challenge is calculated by using the vector challenge and the basis vector, and the Schnorr response is calculated by using the vector response and the basis vector.

In various embodiments, if data which should be selected at random is not included in a case where the signature apparatus generates a signature text validly, the data is rejected, the data which should be selected at random is input to each of the hash functions calculated by the first commitment validity verifying means, one component of the vector response is input to each of the hash functions, the Schnorr challenge is a linear equation of the vector challenge and a linear equation of the basis vector, and the Schnorr response is a linear equation of the vector response and a linear equation of the basis vector.

In an exemplary embodiment, the Schnorr challenge is an inner product of the vector challenge and the basis vector, and the Schnorr response is an inner product of the vector response and the basis vector.

In a representative embodiment, assuming that the message is M, and the to-be-verified signature text is ($\{C\_\{ij\}\}$, $\{r\_\{cjj\}\}$, G, Ξ), the vector challenge calculating means calculates $K=(c\_\{1\}, \ldots, c\_\{N\})=H\_\{\{0, 1\}^{N}\}(g, h, \{C\_\{ij\}\}, G, M)$; the first commitment validity verifying means determines whether or not $C\_\{c\_jj\}=H\_\{\{0, 1\}^v\}(\xi\_j, r\_\{c\_jj\})$ for all $j=1, \ldots, N$ is satisfied, if the relation for all j is satisfied, it is determined to be b=1, and if not, it is determined to be b=0; when b=0, the second validity verifying means determines whether or not $g^{\{<V, \Xi>\}}=h^{\{<V, K>\}}G$ is satisfied; if $g^{\{<V, \Xi>\}}=h^{\{<V, K>\}}G$ is not satisfied, b=0 is designated, and data indicating that the signature text is rejected is output; and if $g^{\{<V, \Xi>\}}=h^{\{<V, K>\}}G$ is satisfied, b=1 is designated, and data indicating that the signature text is accepted is output.

Some embodiments are characterized by using a method of determining a validity of a proof text by the methods discussed-above.

Other embodiments are characterized by using a method of determining a validity of a signature text by the methods discussed-above.

Various embodiments are characterized by using a method of determining a validity of a signature text generated by the method s discussed-above.

Some embodiments provide a proving apparatus for determining a validity of a public key in a verifying apparatus using a verifier-designated proving scheme, wherein the public key of the verifying apparatus includes two data, the first data and the second data belong to the same cyclic group, and a secret key of a verifier or a portion thereof is obtained by designating the first data to an order and designating the second data to a discrete logarithm.

Several embodiments provide a proving apparatus for determining a validity of a public key in a verifying apparatus using a verifier-designated proving scheme, wherein the public key of the verifying apparatus includes two data, the first data and the second data belong to the same cyclic group, a secret key of a verifier or a portion thereof is obtained by designating the first data to an order and designating the second data to a discrete logarithm, a signature text generated by the signature apparatus according to claim 5 is used as a proof text or a portion thereof for determining validity.

A representative embodiment provides a proving apparatus for determining a validity of a public key in a verifying apparatus using a verifier-designated proving scheme, wherein the public key of the verifying apparatus includes two data, the first data and the second data belong to the same cyclic group, a secret key of a verifier or a portion thereof is obtained by designating the first data to an order and designating the second data to a discrete logarithm, and a signature text generated by the signature apparatus according to claim 9 is used as a proof text or a portion thereof for determining validity.

Various embodiments provide a proving apparatus for determining a validity of a public key in a verifying apparatus using a verifier-designated proving scheme, the public key of the verifying apparatus includes two data, the first data and the second data belong to the same cyclic group, a secret key of a verifier or a portion thereof is obtained by designating the first data to an order and designating the second data to a discrete logarithm, and a signature text generated by the signature apparatus according to claim 14 is used as a proof text or a portion thereof for determining validity.

A plurality of embodiments provide a verifying apparatus for verifying a validity of a proof text for a public key of a verifier-designated proving scheme verifying apparatus, wherein the verifying is performed by using the method according to claim 20.

Some embodiments provide a verifying apparatus for verifying a validity of a proof text for a public key of a verifier-designated proving scheme verifying apparatus, wherein the verifying is performed by using the method according to claim 25.

A number of embodiments are characterized by using a signature text generated by using the methods discussed-above as a proof text or a portion thereof for proving a knowledge of a random number used to generate a cipher text.

Various embodiments are characterized by using a signature text generated by using the methods discussed-above as a proof text or a portion thereof for proving a knowledge of a random number used to generate a cipher text.

Representative embodiments are characterized by using a signature text generated by using the methods discussed-above as a proof text or a portion thereof for proving a knowledge of a random number used to generate a cipher text.

Some embodiments are characterized by including a proof text as a portion of a cipher text and verifying the proof text by using the methods discussed-above.

Various embodiments are characterized by including a proof text as a portion of a cipher text and verifying the proof text by using the methods discussed-above.

Effect of the Invention

According to the present invention, the hash value is used as a commitment, so that it is possible to summarize secret information of an attacker from the commitment without rewinding the attacker and to ensure a higher safety than that of a Schnorr signature scheme. In addition, one-time power residue calculation is performed in each of the signature and verification calculations, thus it is possible to lower an amount of calculation in the signature and verification calculations.

DESCRIPTION OF EXEMPLARY EMBODIMENTS

Hereinafter, configurations and operations of a signature apparatus and a verifying apparatus according to exemplary embodiments will be described.

First Exemplary Embodiment

FIG. 1 is a block diagram illustrating configurations of a signature apparatus SBN0 and a verifying apparatus VBN0 according to a first exemplary embodiment. The signature apparatus SBN0 receives data by using a receiving apparatus RBN0 and transmits data through a transmitting apparatus SeBN0. The verifying apparatus VBN0 receives data by using a receiving apparatus RBN1. For example, LAN or Internet can be used as a channel used for data communication, but the present invention is not limited thereto.

Now, symbols used in the embodiment are described.

Symbol A denotes a cyclic group of which order is q. The number of bits of the order q is κ. Symbol g denotes a base point of the cyclic group A. It is assumed that, although the order q of the cyclic group A is publicized, the discrete logarithm problem associated with the cyclic group A is hard to falsify.

Symbol Z denotes a ring of all integers. Symbol N denotes a set of all natural numbers. An i-th component of a vector "a" is denoted by $a\_i$. An inner product is denoted by $<\bullet, \bullet>$. An inner product of a vector "a" and a vector "b" is represented by $<a, b> = a\_1 b\_1 + \ldots a\_N b\_N$. An X-value hash function of a set X is denoted by $H\_X$.

Now, a key generating method is described. An $x \in (Z/qZ) \backslash \{0\}$ is taken at random, and $h = g^x$ is obtained. A public key and a secret key are (g, h, q) and x, respectively. The signature apparatus SBN0 reserves the public key and the secret key in a storage unit SB0. It is assumed that the public key is reserved in a location, from which the verifying apparatus VBN0 can acquire the public key in any type of an acquisition method. The acquisition method is, for example, means for reserving the public key in a public key table publicized on the Internet or means for directly acquiring the public key from the signature apparatus SBN0. The verifying apparatus VBN0 acquires the public key and reserves the public key in the storage unit SB0 if needed. Details of the key generating method are disclosed in Non-Patent Document 11. Hereinafter, the description is made under the state that the verifying apparatus VBN0 has already acquired the public key.

The operations of the signature apparatus SBN0 are described with reference to FIGS. 1 to 3.

When the receiving apparatus RBN0 receives a message, the signature apparatus SBN0 inputs the message to an input unit SB1. A signature text is generated and output in a committed vector selecting unit SB2, a first commitment calculating unit SB3, a basis vector calculating unit SB4, a second commitment calculating unit SB5, a vector challenge calculating unit SB6, a vector response calculating unit SB7, and a signature text output unit SB8.

Each of the units (SB1 to SB7) reads the data from the storage unit SB0, processes the data, and store the data in the storage unit SB0 if needed.

Now, detailed processes of each of the units (SB1 to SB7) are described.

The input unit SB1 receives a message M from the receiving apparatus RBN0 and stores the message M in the storage unit SB0.

Processes of the committed vector selecting unit SB2 are described.

When the message M is stored in the storage unit SB0, the committed vector selecting unit SB2 reads the order q from the storage unit SB0 (SF2). When the order q is read, the committed vector selecting unit SB2 selects at random a residue group of order q, that is, $X\_\{01\}, \ldots, X\_\{0N\} \in (Z/qZ)$ (SF3). The $X\_\{1j\} = x + X\_\{0j\}$ mod q for all the j=1, \ldots, N is calculated (SF4). The $X\_\{0j\}$ for i=0 and j=1, \ldots, N is set to $Y\_0$, and the $X\_\{1j\}$ for i=0 and j=1, \ldots, N is set to $Y\_1$ (SF5). The $Y\_0$ and the $Y\_1$ are referred to as i-th committed vectors. The $Y\_0$ and the $Y\_1$ are stored in the storage unit SB0 (SF6).

Processes of the first commitment calculating unit SB3 are described.

The first commitment calculating unit SB3 reads (v, g, h, $\{X\_\{ij\}\}$), i, j, r) from the storage unit SB0 (SF7). The first commitment calculating unit SB3 selects at random a bit column r of v bits (SF8). A hash value $C\_\{ij\} = H\_\{\{0,1\}^v\}(g, h, X\_\{ij\}, i, j, r)$ of data including the bit column r and the public key (g, h, q) is calculated (SF9). Here, i=0 and 1. In the embodiment, the hash value $C\_\{ij\}$ calculated by the first commitment calculating unit SB3 is set to a first commitment, and $\{C\_\{ij\}\}\_\{i=0, 1, j=1, \ldots, N\}$ is set to a first commitment vector.

The first commitment vector (r, $\{C\_\{ij\}\}$) calculated by the first commitment calculating unit SB3 is stored in the storage unit SB0 (SF10).

Processes of the basis vector calculating unit SB4 are described.

The basis vector calculating unit SB4 reads (q, N, g, h, $\{C\_\{ij\}\}$) from the storage unit SB0 (SF11).

The basis vector calculating unit SB4 calculates a hash value $V = (u\_1, \ldots, u\_N) = H\_\{((Z/qZ)\backslash\{0\})^\{N\}\}(g, h, \{C\_\{ij\}\})$ of data including the public key (q, g, h) and the first commitment $\{C\_\{ij\}\}$ (SF12) and stores the V as a basis vector in the storage unit SB0 (SF13).

The second commitment calculating unit SB5 is described.

The second commitment calculating unit SB5 reads (q, g, V, $Y\_0$) from the storage unit SB0 (SF14) and calculates an inner product of the basis vector V and the $Y\_0$ (SF15). The second commitment calculating unit SB5 calculates a second commitment $G = g^\{X\}$ (SF16) and stores the second commitment G in the storage unit SB0 (SF17).

Operations of the vector challenge calculating unit SB6 are described.

The vector challenge calculating unit SB6 reads (g, h, $\{C\_\{ij\}\}$, G, r, M) from the storage unit SB0 (SF18), calculates a vector challenge $K = (c\_1, \ldots, c\_N) = H\_\{\{0,1\}^N\}(g, h, \{C\_\{ij\}\}, G, r, M)$ (SF19), and stores the vector challenge in the storage unit SB0 (SF20).

Operations of the vector response calculating unit SB7 are described.

The vector response calculating unit SB7 reads ($\{X\_\{ij\}\}$, $\{c\_j\}$) from the storage unit SB0 (SF21), calculates $\xi\_\{j\} = c\_\{ij\}$ for j=1, \ldots, N (SF23), and stores a vector response $\Xi = (\xi\_1, \ldots, \xi\_\kappa)$ in the storage unit SB0 (SF24).

Operations of the signature text output unit SB8 are described.

The signature text output unit SB8 reads a signature text (r, $\{C\_\{ij\}\}$, G, $\Xi$) (SF25) and outputs the signature text (r, $\{C\_\{ij\}\}$, G, $\Xi$) to the verifying apparatus VBN0 (SF26).

Now, a configuration and operations of the verifying apparatus VBN0 are described with reference to FIGS. 1 and 4.

When the receiving apparatus RBN1 receives a message M, an input unit VB1 stores the message M and its signature text (r, $\{C\_\{ij\}\}$, G, $\Xi$) in the storage unit VB0 (VF1). When the message M and the signature text (r, $\{C\_\{ij\}\}$, G, $\Xi$) are stored in the storage unit VB0, a validity of the signature text is verified through the later-described verifying processes of a basis vector calculating unit VB2, a vector challenge VB3, a first validity verifying unit VB4, a second validity verifying unit VB5, and an output unit VB6.

Operations of the basis vector calculating unit VB2 are described.

The basis vector calculating unit VB2 reads (N, g, h, $\{C\_\{ij\}\}$) from the storage unit VB0 (VF2), calculates a basis vector $V=(u\_1, \ldots, u\_N)=H\_\{((Z/qZ)\backslash\{0\})\char`\^\{N\}\}(g, h, \{C\_\{ij\}\})$ (VF3), and stores the basis vector in the storage unit VB0 (VF4).

Operations of the vector challenge calculating unit VB3 are described.

The vector challenge calculating unit VB3 reads (v, g, h, $\{C\_\{ij\}\}$, G, r, M) from the storage unit VB0 (VF5), calculates a vector challenge $K=(c\_1, \ldots, c\_N)=H\_\{\{0, 1\}\char`\^v\}(g, h, \{C\_\{ij\}\}, G, r, M)$ (VF6), and stores the vector challenge in the storage unit VB0 (VF7).

Operations of the first commitment validity verifying unit VB4 are described.

The first commitment validity verifying unit VB4 reads (v, g, h, $\xi\_\{j\}$, $\{c\_j\}$, $\{C\_\{c\_{ij}\}\}$) from the storage unit VB0 (VF8). It is verified whether or not $H\_\{\{0, 1\}\char`\^\{v\}\}(g, h, \xi\_\{j\}, c\_j, j, r)=C\_\{c\_{ij}\}$ for $j=1, \ldots, N$ is satisfied. For the j in which $H\_\{\{0, 1\}\char`\^\{v\}\}(g, h, \xi\_\{j\}, c\_j, j, r)=C\_\{c\_{ij}\}$ is satisfied, b=1 is designated, and for the j in which $H\_\{\{0, 1\}\char`\^\{v\}\}(g, h, \xi\_\{j\}, c\_j, j, r)=C\_\{c\_{ij}\}$ is not satisfied, b=0 is designated, and the data are stored in the storage unit VB0 (VF9). In addition, the first commitment validity verifying unit VB4 determines whether or not b corresponding to $j=1, \ldots, N$ is 0 (VF10). When b=0 (VF10/YES), the verification is ended. When b=1 (VF10/NO), processes of the second validity verifying unit VB5 are performed.

The second validity verifying unit VB5 reads (b, g, h, V, Ξ, K, G) from the storage unit VB0 (VF12). Next, it is checked whether or not $g\char`\^\{<V, \Xi>\}=h\char`\^\{<V, K>\}G$ is satisfied, and when the equation is satisfied, the b=1 stored in the step VF9 is replaced with b=0 (VF13, VF14). Here, the <V, Ξ> is set to a Schnorr response, and the <V, K> is set to a Schnorr challenge.

Finally, the output unit VB6 outputs data indicating that the signature text is accepted if b=1 and data indicating that the signature text is rejected if b=0.

Second Exemplary Embodiment

FIG. 1 is a block diagram illustrating configurations of a signature apparatus SBN0 and a verifying apparatus VBN0 according to a second exemplary embodiment. The signature apparatus SBN0 receives data by using a receiving apparatus RBN0 and transmits data through a transmitting apparatus SeBN0. The verifying apparatus VBN0 receives data by using a receiving apparatus RBN1. For example, LAN or Internet can be used for transmission/reception of data, but the present invention is not limited thereto.

Now, symbols used in the embodiment are described.

Symbol A denotes a cyclic group of which order is q. The number of bits of the order q is κ. Symbol g denotes a base point of the cyclic group A. In addition, it is assumed that, although the order q of the cyclic group A is publicized, the discrete logarithm problem associated with the cyclic group A is hard to falsify.

Symbol Z denotes a ring of all integers. Symbol N denotes a set of all natural numbers. An i-th component of a vector "a" is denoted by $a\_i$. Inner product is denoted by <•, •>. An inner product of a vector "a" and a vector "b" is represented by $<a, b>=a\_1 b\_1 + \ldots a\_N b\_N$. An X-value hash function of a set X is denoted by $H\_X$. In addition, $R\_\{\kappa+\zeta\}=Z\cap[0, 2\char`\^\{\kappa+\zeta\}]$ is defined. A hash value function of the set X is denoted by $H\_X$.

Now, a key generating method is described. An $x \in (Z/qZ)\backslash\{0\}$ is taken at random, and $h=g\char`\^x$ is obtained. A public key and a secret key are (g, h, q) and x, respectively. The signature apparatus SBN0 stores the public key and the secret key in a storage unit SB0. It is assumed that the public key is reserved in a location, from which the verifying apparatus VBN0 can acquire the public key in any type of an acquisition method. The acquisition method is, for example, means for using a means for reserving the public key in a public key table publicized on the Internet or means for directly acquiring the public key from the signature apparatus SBN0. The verifying apparatus VBN0 acquires the public key and stores the public key in the storage unit SB0 if needed. Details of the key generating method are disclosed in Non-Patent Document 11. Hereinafter, the description is made under the state that the verifying apparatus VBN0 has already acquired the public key.

Specific operations of the signature apparatus SBN0 according to the embodiment are described with reference to FIGS. 1, 5, and 6.

When the receiving apparatus RBN0 receives a message, the signature apparatus SBN0 inputs the message to an input unit SB1. A signature text is generated and output in a committed vector selecting unit SB2, a first commitment calculating unit SB3, a basis vector calculating unit SB4, a second commitment calculating unit SB5, a vector challenge calculating unit SB6, a vector response calculating unit SB7, and a signature text output unit SB8.

Specific operations of the committed vector selecting unit SB2 are described.

The committed vector selecting unit SB2 reads (M, κ, ζ) from the storage unit SB0 (SF22). The committed vector selecting unit SB2 selects a residue group $X\_\{01\}, \ldots, X\_\{0N\}$ from $R\_\{\kappa+\zeta\}$ (SF23). The $X\_\{1j\}=x+X\_\{0j\}$ for all the $j=1, \ldots, N$ is calculated (SF24). The $X\_\{0j\}$ for i=0 and $j=1, \ldots, N$ is set to $Y\_0$, and the $X\_\{1j\}$ for i=0 and $j=1, \ldots, N$ is set to $Y\_1$ (SF25). The $Y\_0$ and the $Y\_1$ are referred to as i-th committed vectors. The $Y\_0$ and the $Y\_1$ are stored in the storage unit SB0 (SF26).

Processes of the first commitment calculating unit SB3 are described.

The first commitment calculating unit SB3 reads (N, $\{c\_\{j\}\}, \{X\_\{ij\}\}$) from the storage unit SB0 (SF27). The first commitment calculating unit SB3 selects at random a bit column r of v bits (SF28). A hash value $C\_\{ij\}=H\_\{\{0, 1\}\char`\^v\}(g, h, X\_\{ij\}, i, j, r)$ of data including the bit column r and the public key (g, h, q) is calculated (SF29). Here, i=0 and 1. In the embodiment, the hash value $C\_\{ij\}$ calculated by the first commitment calculating unit SB3 is set to a first commitment, and the $\{C\_\{ij\}\}\_\{i=0, 1, j=1, \ldots, N\}$ is set to a first commitment vector.

The first commitment vector (r, $\{C\_\{ij\}\}$) calculated by the first commitment calculating unit SB3 is stored in the storage unit SB0 (SF210).

Processes of the basis vector calculating unit SB4 are described.

The basis vector calculating unit SB4 reads (κ, ζ, N, g, h, $\{C\_\{ij\}\}$) from the storage unit SB0 (SF211).

The basis vector calculating unit SB4 calculates a hash value $V=(u\_1, \ldots, u\_N)=H\_\{(R\_\{\kappa+\zeta\}\backslash\{0\})\char`\^\{N\}\}(g, h, \{C\_\{ij\}\})$ of data including the public key (q, g, h) and the first commitment $\{C\_\{ij\}\}$ (SF212) and stores the V as a basis vector in the storage unit SB0 (SF213).

The second commitment calculating unit SB5 is described.

The second commitment calculating unit SB5 reads (V, $Y\_0$, G) from the storage unit SB0 (SF214) and calculates an inner product of the basis vector V and the $Y\_0$ (SF215). The second commitment calculating unit SB5 calculates a second commitment $G=g\char`\^\{X\}$ (SF216) and stores the second commitment G in the storage unit SB0 (SF217).

Operations of the vector challenge calculating unit SB6 are described.

The vector challenge calculating unit SB6 reads (g, h, $\{C\_\{ij\}\}$, G, r, M) from the storage unit SB0 (SF18), calculates a vector challenge $K=(c\_1, \ldots, c\_N)=H\_\{\{0, 1\}^\wedge N\}$ (g, h, $\{C\_\{ij\}\}$, G, r, M) (SF19), and stores the vector challenge in the storage unit SB0 (SF220).

Operations of the vector response calculating unit SB7 are described.

The vector response calculating unit SB7 reads (N, $\{c\_\{j\}\}$, $\{X\_\{ij\}\}$) from the storage unit SB0 (SF221), calculates $\xi\_\{j\}=X\_\{c\_jj\}$ for $j=1, \ldots, N$ (SF223), and stores the $\xi\_\{j\}=X\_\{c\_jj\}$ as a vector response $\Xi=(\xi\_1, \ldots, \xi\_\kappa)$ in the storage unit SB0 (SF24).

Operations of the signature text output unit SB8 are described.

The signature text output unit SB8 reads a signature text (r, $\{C\_\{ij\}\}$, G, $\Xi$) (SF225) and outputs the signature text (r, $\{C\_\{ij\}\}$, G, $\Xi$) to the verifying apparatus VBN0 (SF226).

A configuration and operations of the verifying apparatus VBN0 are described with reference to FIGS. 1 and 7.

When the receiving apparatus RBN1 receives a message M, an input unit VB1 stores the message M and its signature text (r, $\{C\_\{ij\}\}$, G, $\Xi$) in the storage unit VB0 (VF1). When the message M and the signature text (r, $\{C\_\{ij\}\}$, G, $\Xi$) are stored in the storage unit VB0, a validity of the signature text is verified through the later-described verifying processes in a basis vector calculating unit VB2, a vector challenge VB3, a first validity verifying unit VB4, a second validity verifying unit VB5, and an output unit VB6.

Operations of the basis vector calculating unit VB2 are described.

The basis vector calculating unit VB2 reads (N, $\kappa$, $\zeta$, g, h, $\{C\_\{ij\}\}$) from the storage unit VB0 (VF22), calculates a basis vector $V=(u\_1, \ldots, u\_N)=H\_\{(R\_\{\kappa+\zeta\}\backslash\{0\})^\wedge\{N\}\}$ (g, h, $\{C\_\{ij\}\}$) (VF23), and stores the basis vector in the storage unit VB0 (VF24).

Operations of the vector challenge calculating unit VB3 are described.

The vector challenge calculating unit VB3 reads (N, g, h, $\{C\_\{ij\}\}$, G, r, M) from the storage unit VB0 (VF25), calculates a vector challenge $K=(c\_1, \ldots, c\_N)=H\_\{\{0, 1\}^\wedge N\}$ (g, h, $\{C\_\{ij\}\}$, G, r, M) (VF26), and stores the vector challenge in the storage unit VB0 (VF27).

Operations of the first commitment validity verifying unit VB4 are described.

The first commitment validity verifying unit VB4 reads (v, g, h, $\xi\_\{j\}$, $\{c\_j\}$, $\{C\_\{c\_jj\}\}$) from the storage unit VB0 (VF28). It is verified whether or not $H\_\{\{0, 1\}^\wedge\{v\}\}$(g, h, $\xi\_\{j\}$, c_j, j, r)$=C\_\{c\_jj\}$ for $j=1, \ldots, N$ is satisfied. For the j in which $H\_\{\{0, 1\}^\wedge\{v\}\}$(g, h, $\xi\_\{j\}$, c_j, j, r)$=C\_\{c\_jj\}$ is satisfied, b=1 is designated, and for the j in which $H\_\{\{0, 1\}^\wedge\{v\}\}$(g, h, $\xi\_\{j\}$, c_j, j, r)$=C\_\{c\_jj\}$ is not satisfied, b=0 is designated (VF210). In addition, the first commitment validity verifying unit VB4 determines whether or not b corresponding to $j=1, \ldots, N$ is 0 (VF210). When b=0 (VF210/NO), the verification is ended. When b=1 (VF210/YES), b=1 is stored in the storage unit VB0 (VF211).

The second validity verifying unit reads (b, g, h, V, $\Xi$, K, G) from the storage unit VB0 (VF212). It is checked whether or not $g^\wedge\{<V, \Xi>\}=h^\wedge\{<V, K>\}G$ is satisfied, and when the equation is satisfied, the b=1 stored in the step VF9 is replaced with b=0 (VF213, VF214)). Here, the $<V, \Xi>$ is set to a Schnorr response, and the $<V, K>$ is set to a Schnorr challenge.

Finally, the output unit VB6 reads b from the storage unit VB0 (VF215), and outputs data indicating that the signature text is accepted if b=1 and data indicating that the signature text is rejected if b=0 (VF216).

Third Exemplary Embodiment

FIG. 8 is a block diagram illustrating configurations of a signature apparatus SB30 and a verifying apparatus VBN30 according to a third exemplary embodiment. The signature apparatus SB30 receives data by using a receiving apparatus RBN30 and transmits data through a transmitting apparatus SeBN30. The verifying apparatus VBN30 receives data by using a receiving apparatus RBN31. For example, LAN or Internet can be used for transmission/reception of data, but the present invention is not limited thereto.

Now, symbols used in the embodiment are described.

Symbol A denotes a cyclic group of which order is q. The number of bits of the order q is $\kappa$. Symbol g denotes a base point of the cyclic group A. It is assumed that, although the order q of the cyclic group A is publicized, the discrete logarithm problem associated with the cyclic group A is hard to falsify.

Symbol Z denotes a ring of all integers. Symbol N denotes a set of all natural numbers. An i-th component of a vector "a" is denoted by $a\_i$. An inner product is denoted by $<\bullet, \bullet>$. An inner product of a vector "a" and a vector "b" is represented by $<a, b>=a\_1 b\_1 + \ldots a\_N b\_N$ mod q. An X-value hash function of a set X is denoted by $H\_X$. A basis vector is defined as $V=(u\_1, \ldots, u\_\{N\})=(2^\wedge\{0\}, \ldots, 2^\wedge\{N-1\})$.

Now, a key generating method is described. An $x \in (Z/qZ)\backslash\{0\}$ is taken at random, and $h=g^\wedge x$ is obtained. A public key and a secret key are (g, h, q) and x, respectively. The signature apparatus SBN30 stores the public key and the secret key in a storage unit SB30. It is assumed that the public key is reserved in a location, from which the verifying apparatus VBN30 can acquire the public key in any type of an acquisition method. The acquisition method is, for example, a method of means for reserving the public key in a public key table publicized on the Internet or means for directly acquiring the public key from the signature apparatus SBN30. The verifying apparatus VBN30 acquires the public key and reserves the public key in the storage unit SB30 if needed. Details of the key generating method are disclosed in Non-Patent Document 11. Hereinafter, the description is made under the state that the verifying apparatus VBN0 has already acquired the public key.

Specific operations of the signature apparatus SBN30 according to the embodiment are described with reference to FIGS. 8, 9, and 10.

When the receiving apparatus RBN30 receives a message, the signature apparatus SBN30 inputs the message to an input unit SB31. A signature text is generated and output in a committed vector selecting unit SB32, a second commitment calculating unit SB33, a first commitment calculating unit SB34, a vector challenge calculating unit SB35, a vector response calculating unit SB36, and a signature text output unit SB37.

The input unit SB31 receives a message M from the receiving apparatus RBN30 and stores the message M in a storage unit SB30.

Specific operations of the committed vector selecting unit SB32 are described.

The committed vector selecting unit SB2 reads (q, x) from the storage unit SB30 (SF32). The committed vector selecting unit SB2 selects a residue group $X\_\{01\}, X\_\{0N\}$ from (Z/qZ) (SF33). The $X\_\{1j\}=x+X\_\{0j\}$ for all the $j=1, \ldots, N$ is calculated (SF34). The $X\_\{0j\}$ for i=0 and $j=1, \ldots, N$ is set to $Y\_0$, and the $X\_\{1j\}$ for i=0 and $j=1, \ldots, N$ is set to Y_1 (SF35). The Y_0 and the Y_1 are referred to as i-th committed vectors. The Y_0 and the Y_1 are stored in the storage unit SB0 (SF36).

Processes of the second commitment calculating unit SB33 are described.

The second commitment calculating unit SB33 reads (q, V, Y_0, g) from the storage unit SB30 (SF37) and calculates a set $X=\{Y\_0, V\}>=\Sigma\_j X\_\{0j\} 2^{j-1}$ modq (SF38). The second commitment calculating unit SB33 calculates a commitment $G=g^{\{X\}}$ (SF39) and stores the commitment G in the storage unit SB30 (SF310).

Processes of the first commitment calculating unit 34 are described.

The first commitment calculating unit 34 reads (v, $\{X\_\{ij\}\}$) (SF311). The first commitment calculating unit 34 selects at random a bit column r of v bits for each of the i, j (SF312). A hash value $C\_\{ij\}=H\_\{\{0,1\}^v\}(X\_\{ij\}, r\_\{ij\})$ of data including the bit column r and the public key (g, h, q) is calculated (SF313). Here, i=0 and 1. In the embodiment, the hash value $C\_\{ij\}$ calculated by the first commitment calculating unit SB34 is set to a first commitment.

The first commitment vector $\{C\_\{ij\}\}$ calculated by the first commitment calculating unit SB3 is stored in the storage unit SB0 (SF314).

Operations of the vector challenge calculating unit SB35 are described.

The vector challenge calculating unit SB35 reads (N, g, h, $\{C\_\{ij\}\}$, G, M) from the storage unit SB0 (SF315), calculates a vector challenge $K=(c\_1, \ldots, c\_N)=H\_\{\{0,1\}^N\}(g, h, \{C\_\{ij\}\}, G, M)$ (SF316), and stores the vector challenge in the storage unit SB0 (SF317).

Operations of the vector response calculating unit SB36 are described.

The vector response calculating unit SB36 reads $(\{c\_\{j\}\}, \{X\_\{ij\}\})$ from the storage unit SB0 (SF318), calculates $\xi\_\{j\}=X\_\{c\_jj\}$ for $j=1, \ldots, N$ (SF319), and stores a vector response $\Xi=(\xi\_1, \ldots, \xi\_\kappa)$ in the storage unit SB30 (SF320, SF321).

Operations of the signature text output unit SB37 are described.

The signature text output unit SB37 reads a signature text $(\{C\_\{ij\}\}, \{r\_\{c\_jj\}\}, G, \Xi)$ (SF322) and outputs the signature text $(\{C\_\{ij\}\}, \{r\_\{c\_jj\}\}, G, \Xi)$ to the verifying apparatus VBN30 (SF323).

A configuration and operations of the verifying apparatus VBN30 are described with reference to FIGS. 8 and 11.

When the receiving apparatus RBN31 receives a message M, input unit VB31 stores the message M and its signature text $(\{C\_\{ij\}\}, \{r\_\{c\_jj\}\}, G, \Xi)$ in a storage unit VB0 (VF31). When the message M and the signature text $(\{C\_\{ij\}\}, \{r\_\{c\_jj\}\}, G, \Xi)$ are stored in the storage unit VB30, a validity of the signature text is verified through the later-described verifying processes of a vector challenge VB32, a first validity verifying unit VB34, a second validity verifying unit VB33, and an output unit VB35.

Operations of the vector challenge calculating unit VB32 are described.

The vector challenge calculating unit VB32 reads (N, g, h, $\{C\_\{ij\}\}$, G, M) from the storage unit VB30 (VF32), calculates a vector challenge $K=(c\_1, \ldots, c\_N)=H\_\{\{0,1\}^N\}(g, h, \{C\_\{ij\}\}, G, M)$ (VF33), and stores the vector challenge in the storage unit VB30 (VF34).

Operations of the first commitment validity verifying unit VB33 are described.

The first commitment validity verifying unit VB33 reads (v, $\xi\_j$, $r\_\{c\_jj\}$, $\{C\_\{c\_jj\}\}$) from the storage unit VB30 (VF35). It is verified whether or not $H\_\{\{0,1\}^v\}(\xi\_j,$ $r\_\{c\_jj\}, j, r)=C\_\{c\_jj\}$ for each of $j=1, \ldots, N$ is satisfied. For the j in which $H\_\{\{0,1\}^v\}(g, h, \xi\_\{j\}, c\_j, j, r)=C\_\{c\_jj\}$ is satisfied, b=1 is designated, and for the j in which $H\_\{\{0,1\}^v\}(g, h, \xi\_\{j\}, c\_j, j, r)=C\_\{c\_jj\}$ is not satisfied, b=0 is designated (VF36). In addition, the first commitment validity verifying unit VB4 determines whether or not b corresponding to $j=1, \ldots, N$ is 0 (VF37). When b=0 (VF37/NO), the verification is ended. When b=1 (VF37/YES), b=1 is stored in the storage unit VB0 (VF38).

The second validity verifying unit 33 reads (b, g, h, V, Ξ, K, G) from the storage unit VB30 (VF39). It is checked whether or not $g^{\{<V, \Xi>\}}=h^{\{<V, K>\}}G$ is satisfied, and when the equation is satisfied, the b=1 stored in the step VF9 is replaced with the b=0 (VF310, VF311). Here, the <V, Ξ> is set to a Schnorr response, and the <V, K> is set to a Schnorr challenge.

Finally, the output unit VB35 reads b from the storage unit VB30 (VF312), and the output unit VB35 outputs data indicating that the signature text is accepted if b=1 and data indicating that the signature text is rejected if b=0.

Example 1

An example of the first exemplary embodiment to which a straight-line extractable proving scheme of a discrete logarithm (Non-Patent Document 12) is applied is described.

Configurations of a proving apparatus and a verifying apparatus are illustrated in FIG. 12. As illustrated in FIG. 12, in the example, there are the proving apparatus PSPBN0 and the verifying apparatus VSPBN0, which correspond to the signature apparatus SBN0 and the verifying apparatus VBN0 according to the first exemplary embodiment, respectively.

In the example, instead of a message M, a predetermined ID or random number is used. Operations of each units are the same as those of the first exemplary embodiment except that the ID or the random number is used instead of the message M.

In addition, in the example, a straight-line extractable proving scheme of the discrete logarithm may be applied to the second or third exemplary embodiment.

Example 2

Example 2 is an example where a verifier-designated proving scheme is applied to a proving apparatus DVSSBN0 and a verifying apparatus DVSVBN0 according to Example 1.

The proving apparatus DVSSBN0 receives data by using a receiving apparatus DVSRBN0 and transmits data through a communication apparatus DVSCBN0. The verifying apparatus DVSVBN0 receives data by using a receiving apparatus DVSRBN1. For example, LAN or Internet can be used as a channel used for data communication.

The proving apparatus DVSSBN0 includes an input unit DVSSB1, a key validity proof text verifying unit DVSSB2, a proving unit DVSSB3, and a storage unit DVSSB0. The data input through the input unit DVSSB0 of the proving apparatus DVSSBN0 is stored in the storage unit DVSSB0.

The verifying apparatus DVSVBN0 includes an output unit DVSVB1, a key validity proof text generating unit DVSSB2, a verifying unit DVSVB3, and a storage unit DVSVB0. The data input through the communication unit DVSCBN0 is stored in the storage unit DVSVB0.

The key validity proof text generating unit DVSSB2 reads required data from the storage unit DVSSB0 and stores a calculation result thereof in the storage unit DVSSB0.

Similarly, the proving unit DVSSB3 reads required data from the storage unit DVSSB0 and stores a calculation result thereof in the storage unit DVSSB0.

The key validity proof text generating unit DVSVB2 reads required data from the storage unit DVSVB0 and stores a calculation result thereof in the storage unit DVSVB0.

Similarly, the verifying unit DVSVB3 reads required data from the storage unit DVSVB0 and stores a calculation result thereof in the storage unit DVSVB0.

The output unit DVSVB1 reads a required data from the storage unit DVSSB0 and outputs the data.

An instance which is used for proving the corresponding secret is shared by the proving apparatus DVSSBN0 and the verifying apparatus DVSVBN0 in advance. For example, there is a method where, the to-be-proven secret is transmitted and received through a channel by using a transmitting/receiving apparatus, and the secret is hard-coded when the proving apparatus DVSSBN0 and the verifying apparatus DVSVBN0 are produced.

The proving apparatus DVSSBN0 is assumed to have the to-be-proven secret in advance. For example, there is a method where the secret is transmitted through the channel by using the transmitting/receiving apparatus or a method where the secret is hard-coded when the proving apparatus DVSSBN0 is produced.

A key generating method in the verifying apparatus DVSVB0 is described. An $x \in (Z/qZ)^*$ is taken at random, and $h=g\hat{}x$ is obtained. A public key and a secret key are (g, h, q) and x, respectively. The storage unit DVSVB0 of the verifying apparatus DVSVBN0 stores the public key (g, h, q) and the secret key x. An acquisition method for the public key (g, h, q) is, for example, an method of reserving the public key in a public key table published on the Internet or a method of directly acquiring the public key from the verifying apparatus DVSVBN00. The proving apparatus DVSSBN0 acquires the public key and stores the public key in the storage unit DVSSB0 if needed. Details of the key generating method are disclosed in Non-Patent Document 11. Hereinafter, the description is made under the state that the proving apparatus DVSSBN0 has already acquired the public key.

Now, operations of each unit of the apparatuses are described.

The verifying apparatus DVSVBN0 operates key validity proof text verifying unit DVSVB2 to generate a proof text indicating that the verifying apparatus has a secret key corresponding to the its own public key. The key validity proof text generating unit DVSVB2 which generates the proof text performs operations which are the same as those of the proving apparatus PSPBN0 (FIG. 12) according to Example 1.

The verifying apparatus DVSVBN0 transmits the generated proof text through the communication apparatus DVSCBN1 to the proving apparatus DVSSBN0. The proving apparatus DVSSBN0 receives the proof text through the communication apparatus DVSCBN0. The proving apparatus DVSPBN0 verifies a validity of the proof text in the key validity proof text verifying unit DVSSB2. The key validity proof text verifying unit DVSSB2 performs operations which are the same as those of the verifying apparatus VSPBN0 (FIG. 12) according to Example 1.

The proving apparatus DVSPBN0 proves whether or not there is a secret corresponding to the instance in the proving unit DVSSB3 or whether or not there is a secret key corresponding to the public key of a verifier. The verifying apparatus DVSVBN0 verifies a validity of the proof in the verifying unit DVSVB3.

Since the proving unit DVSSB3 and the verifying unit DVSVB3 are the same as a proving method and a verifying method in Non-Patent Document 13, the description thereof is not repeated. Details thereof are disclosed in Non-Patent Document 13.

Example 3

In Example 3, a crypto scheme added to the configurations and operations of Example 1 is implemented (see FIG. 14).

In the example, there are an encrypting apparatus EVEN0 and a decrypting apparatus DVEN1. The encrypting apparatus EVEN1 receives data by using a receiving apparatus RBS0 and transmits data through a transmitting apparatus SeBE0. The decrypting apparatus DBEN0 receives data by using a receiving apparatus RBE1. For example, LAN or Internet can be used for data communication, but not limited thereto.

A key generating method in the encrypting apparatus EBEN0 is described. An $x \in (Z/qZ)^*$ is taken at random, and $h=g\hat{}x$ is obtained. A public key and a secret key are (g, h, q) and x, respectively. A storage unit EEB0 of the encrypting apparatus EBEN0 stores the public key and the secret key. The public key is reserved in a location from which the decrypting apparatus DBEN0 can acquires the public key in any type of an acquisition method. The acquisition method is, for example, means for reserving the public key in a public key table publicized on the Internet or means for directly acquiring the public key from the encrypting apparatus EBEN0. The decrypting apparatus DBEN0 acquires the public key and reserves the public key in the storage unit DBE0 if needed. Details of the key generating method are disclosed in Non-Patent Document 11. Hereinafter, the description is made under the state that the decrypting apparatus DVEN0 has already acquired the public key in advance.

In the encrypting apparatus EBEN0, processes of an input unit EBE1, an encrypting unit EBE2, and a proving unit EBE3 are sequentially performed.

When the input unit EBE1 receives a to-be-encrypted message $m \in G$, the message $m \in G$ is stored in the storage unit EBE0.

In the encrypting unit EBE2, an ElGamal cipher text of the message $m \in G$ is generated. More specifically, the encrypting unit EBE2 reads required data from the storage unit EBE0 and selects $y \in Z/qZ$ at random. $I=g\hat{}\{y\}$ and $J=mh\hat{}\{y\}$ are calculated, and a cipher text (I, J) is generated. The generated cipher text (I, J) is stored in the storage unit EBE0.

The proving unit EBE3 reads required data from the storage unit EBE0 and generates a proof text P which is associated with a discrete logarithm problem of I with g as a base in the same manner as that of the proving apparatus PSPBN0 (see FIG. 12) according to Example 1. Finally, a cipher text (I, J, P) is stored in the storage unit EBE.

When the receiving apparatus RBE1 receives cipher text (I, J, P), the receiving apparatus RBE1 stores the cipher text (I, J, P) in the storage unit DBE0. Processes of a verifying unit DBE1, a decrypting unit DBE3, and an output unit DBE4 are sequentially performed.

The verifying unit DBE1 reads required data from the storage unit DBE and verifies the cipher text P in the same manner as that of the verifying apparatus VSPBN0 (see FIG. 12) according to Example 1. If it is determined that the cipher text P is valid, b=1 is designated, and if not, b=0 is designated. The determination result is stored in the storage unit DBE.

The decrypting apparatus DBEN0 reads b from the storage unit DBE0. If b=0, data indicating that "cipher text is invalid" is output, and if b=1, processes of the decrypting unit DBE3 are performed.

The decrypting unit DBE3 decrypts the ElGamal cipher text by using a typical decrypting operation. More specifically, the decrypting unit DBE3 reads required data from the storage unit DBE0 and calculates m'=J/I^y. The calculation result is stored in the storage unit DBE0.

The output unit DBE4 reads the m' from the storage unit DBE0 and outputs the m'.

BRIEF DESCRIPTION OF THE DRAWINGS

FIG. 1 is a block diagram illustrating configurations of a signature apparatus and a verifying apparatus.

FIG. 4 is a flowchart of processes of the verifying apparatus.

FIG. 7 is a flowchart of processes of the verifying apparatus.

FIG. 11 is a flowchart of processes of the verifying apparatus.

FIG. 12 is a block diagram illustrating configuration of a signature apparatus and a verifying apparatus.

REFERENCE NUMERALS

Figure 2:
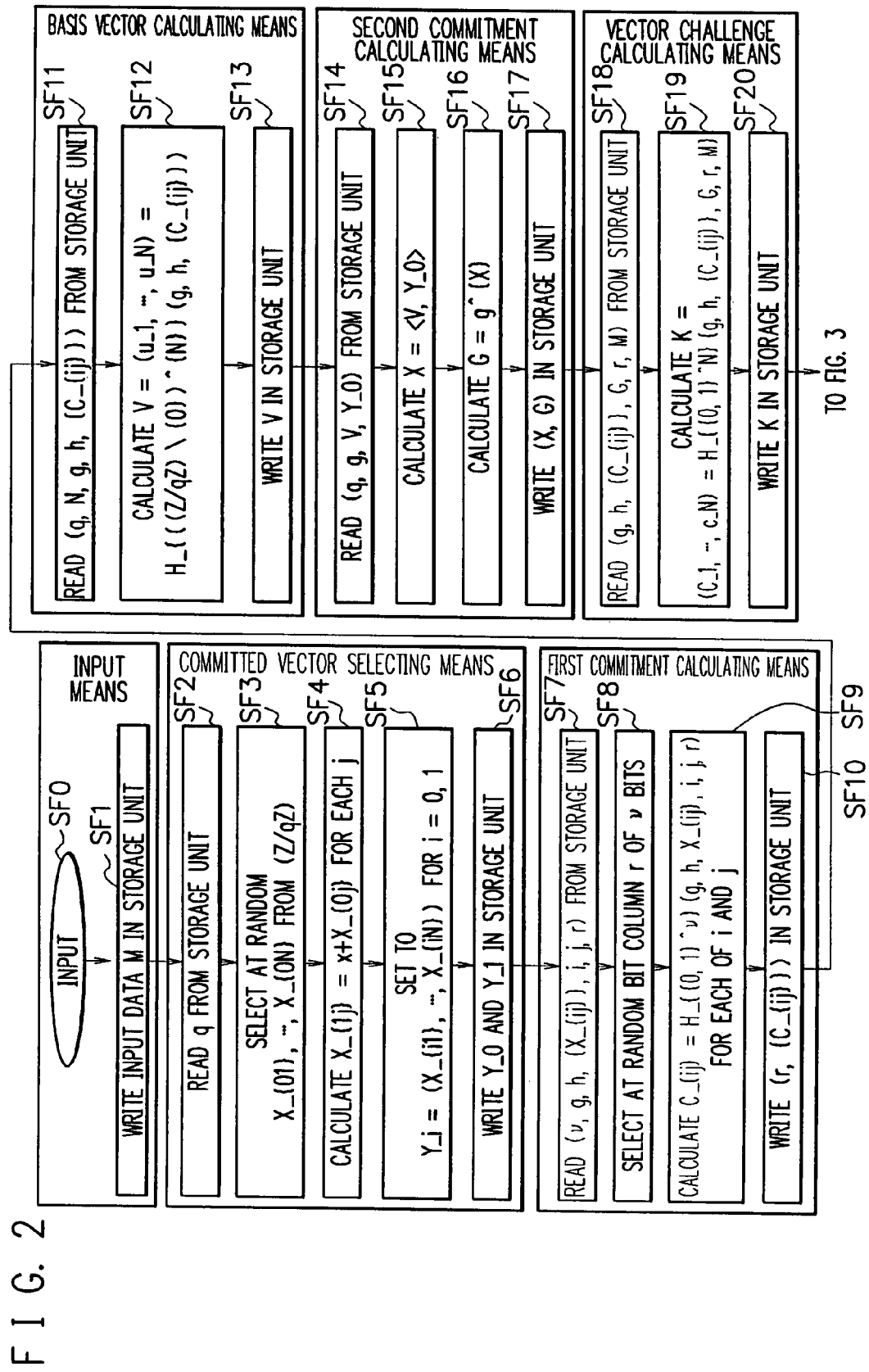
FIG. 2 is a flowchart of processes of the signature apparatus.
Figure 3:
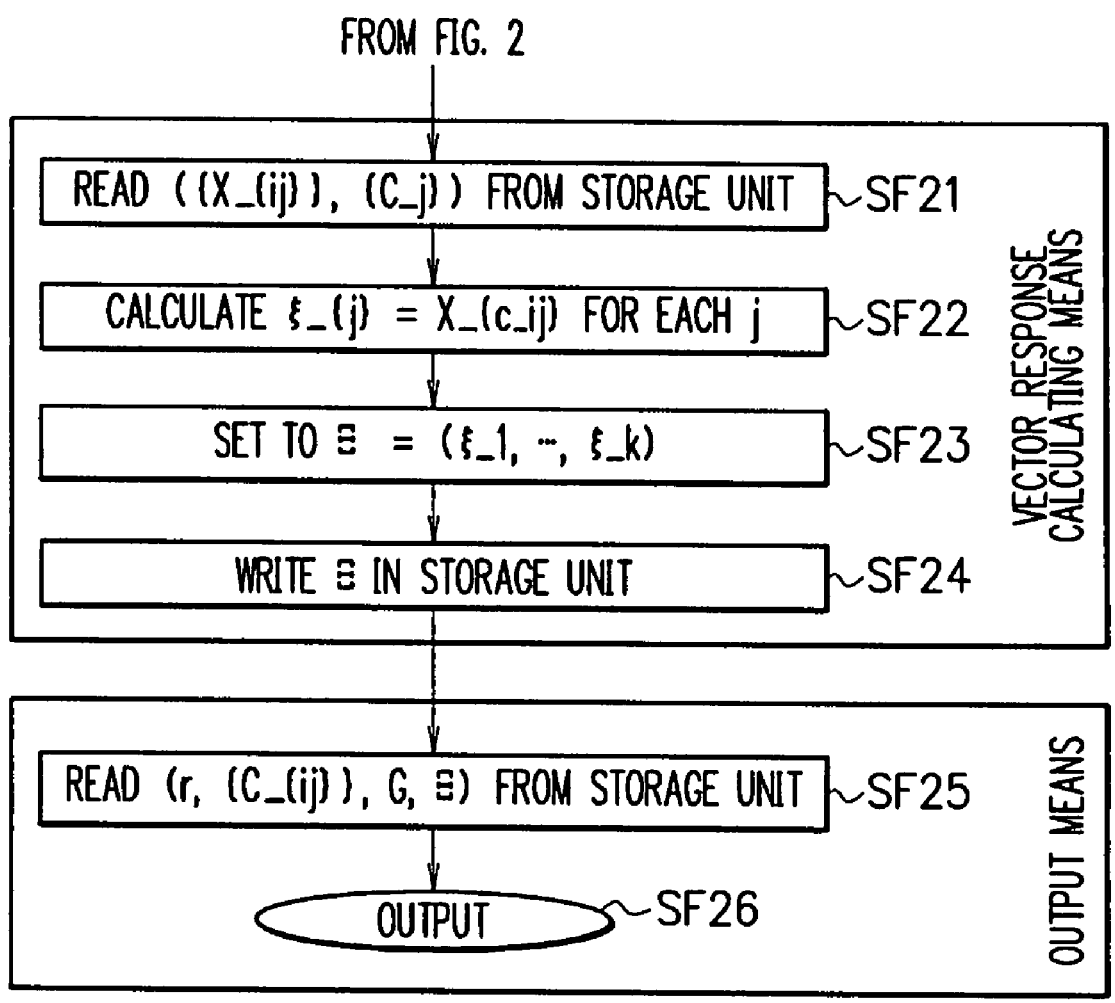
FIG. 3 is a flowchart of processes of the signature apparatus.
Figure 5:
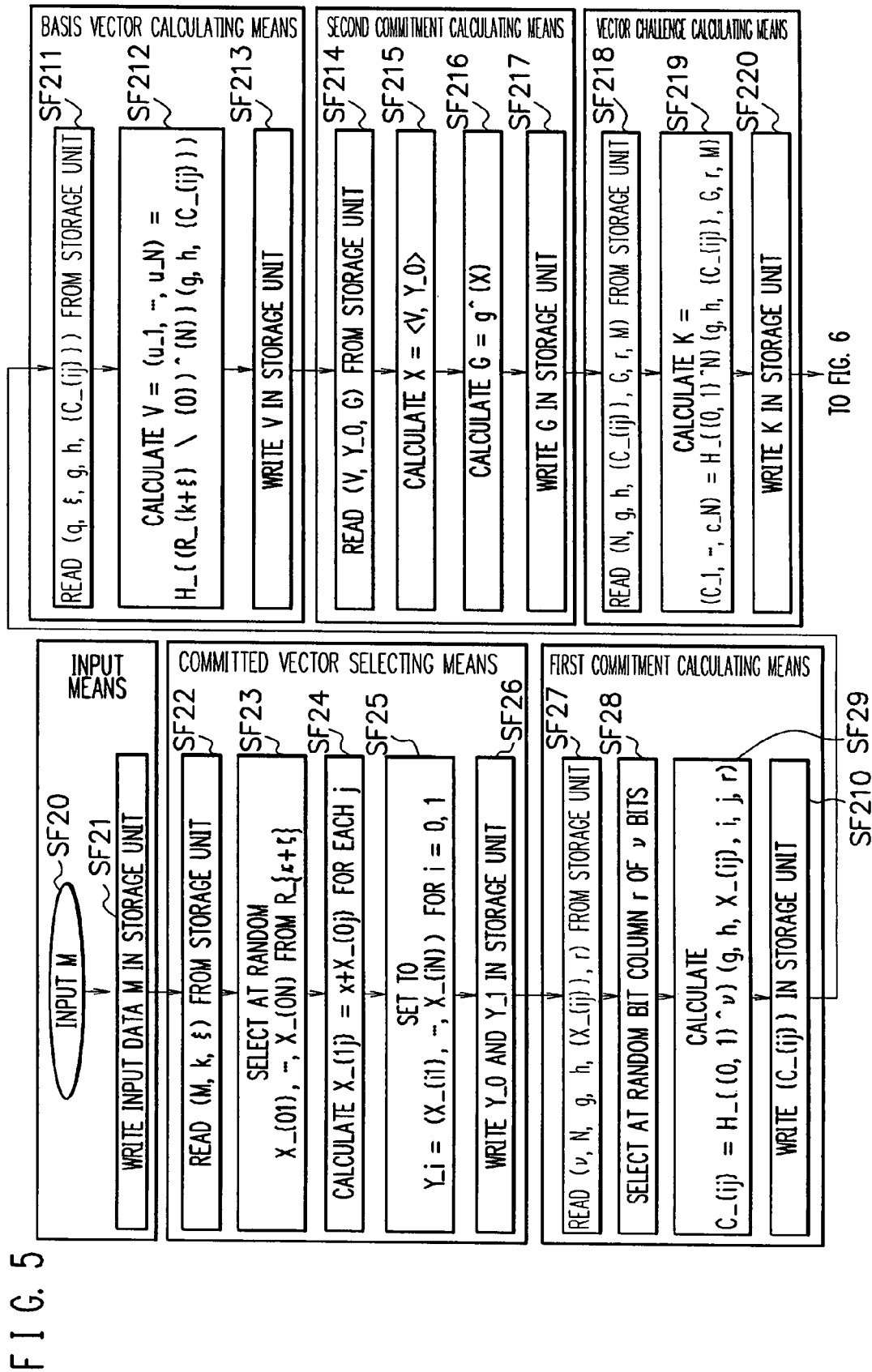
FIG. 5 is a flowchart of processes of the signature apparatus.
Figure 6:
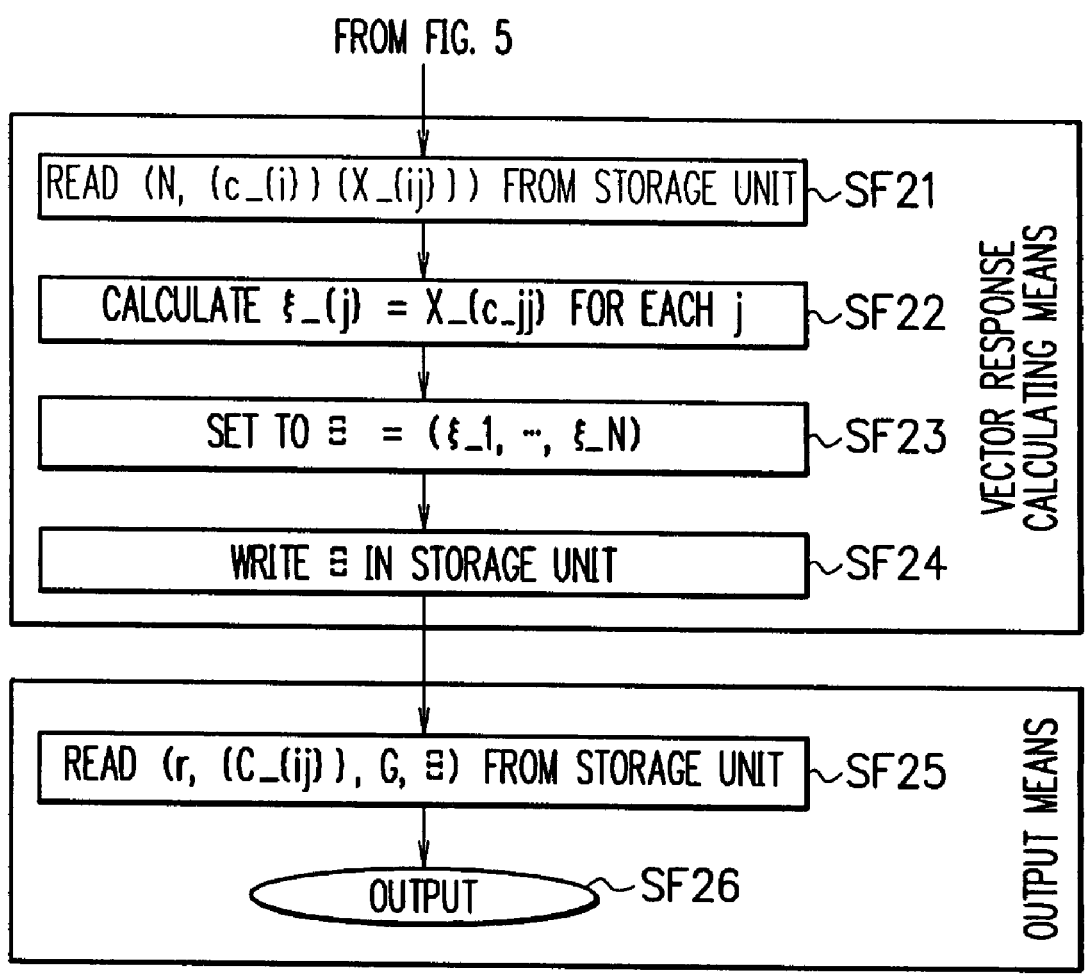
FIG. 6 is a flowchart of processes of the signature apparatus.
Figure 8:
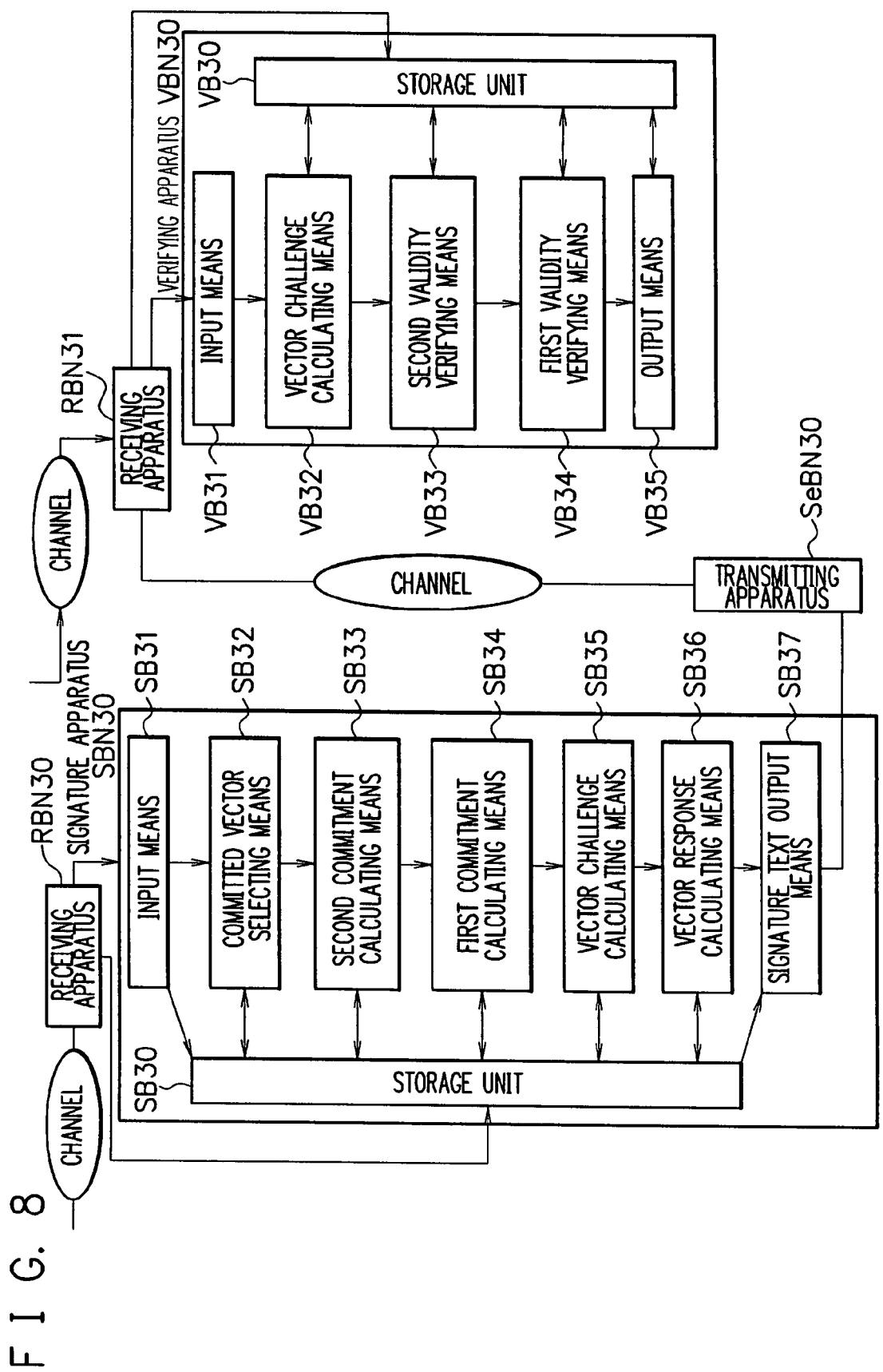
FIG. 8 is a block diagram illustrating configuration of a signature apparatus and a verifying apparatus.
Figure 9:
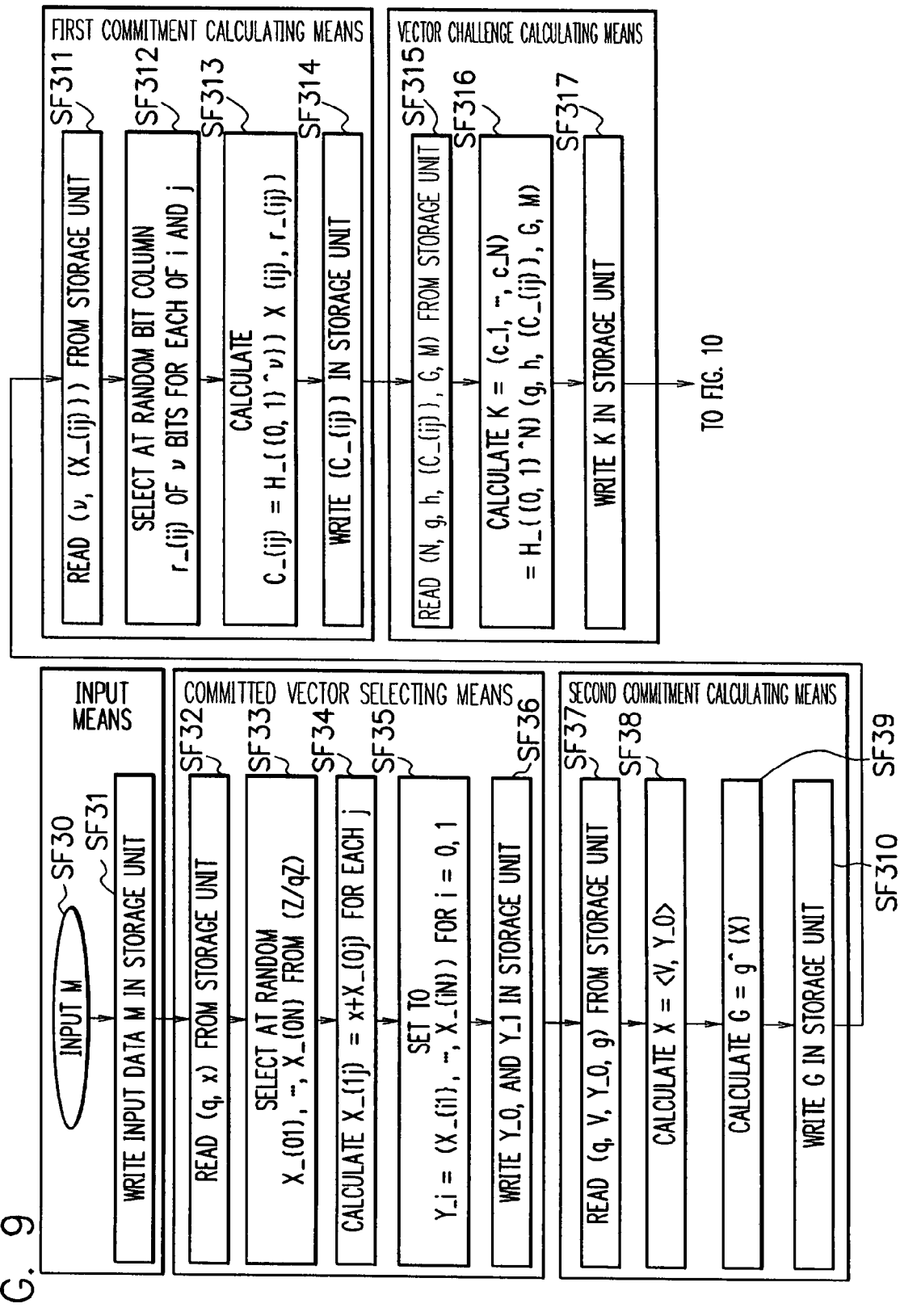
FIG. 9 is a flowchart of processes of the signature apparatus.
Figure 10:
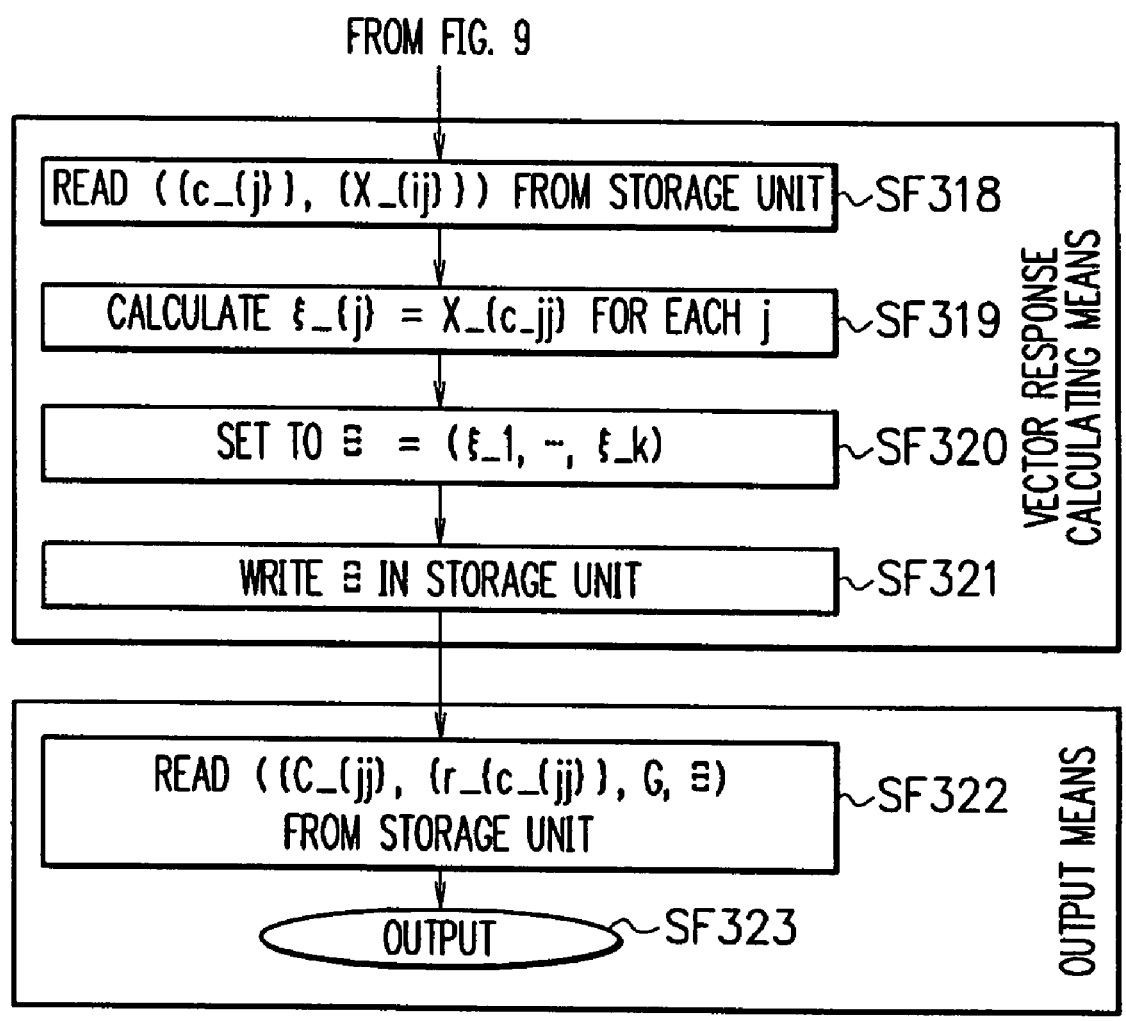
FIG. 10 is a flowchart of processes of the signature apparatus.
Figure 13:
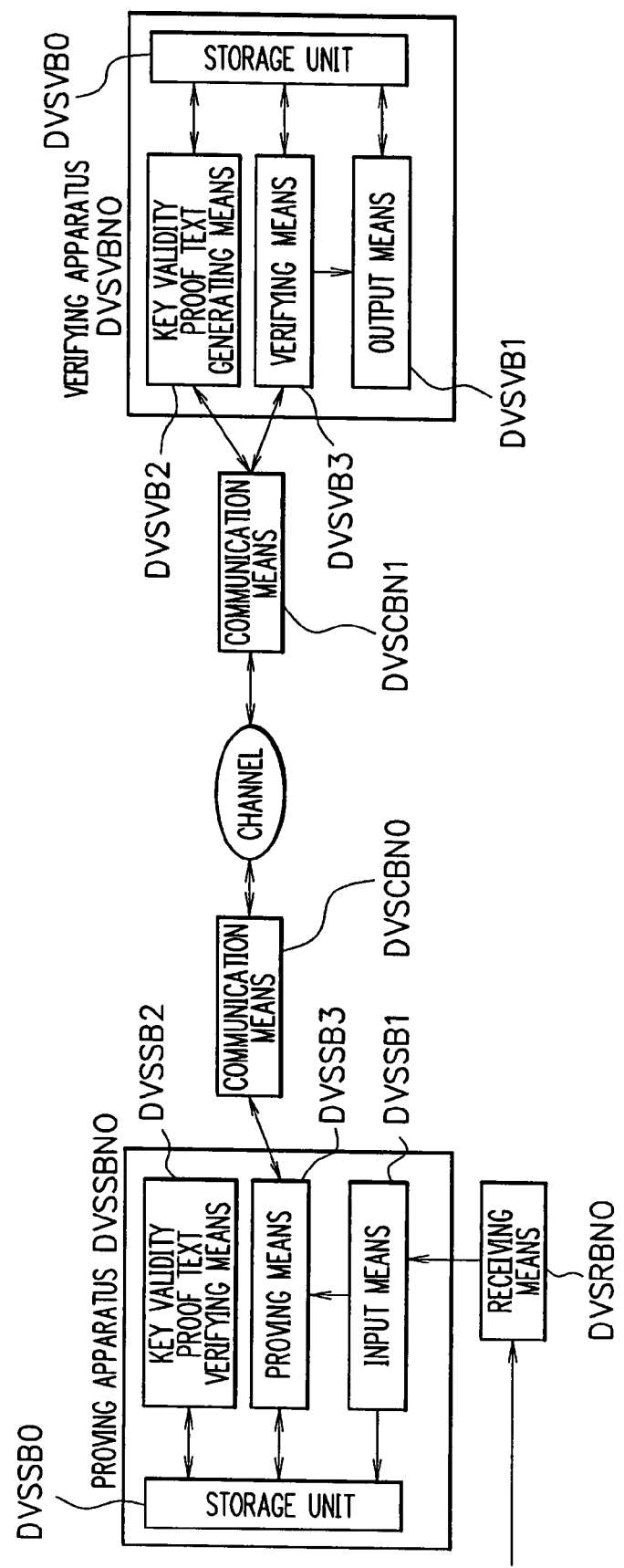
FIG. 13 is a block diagram illustrating configuration of a proving apparatus and a verifying apparatus.
Figure 14:
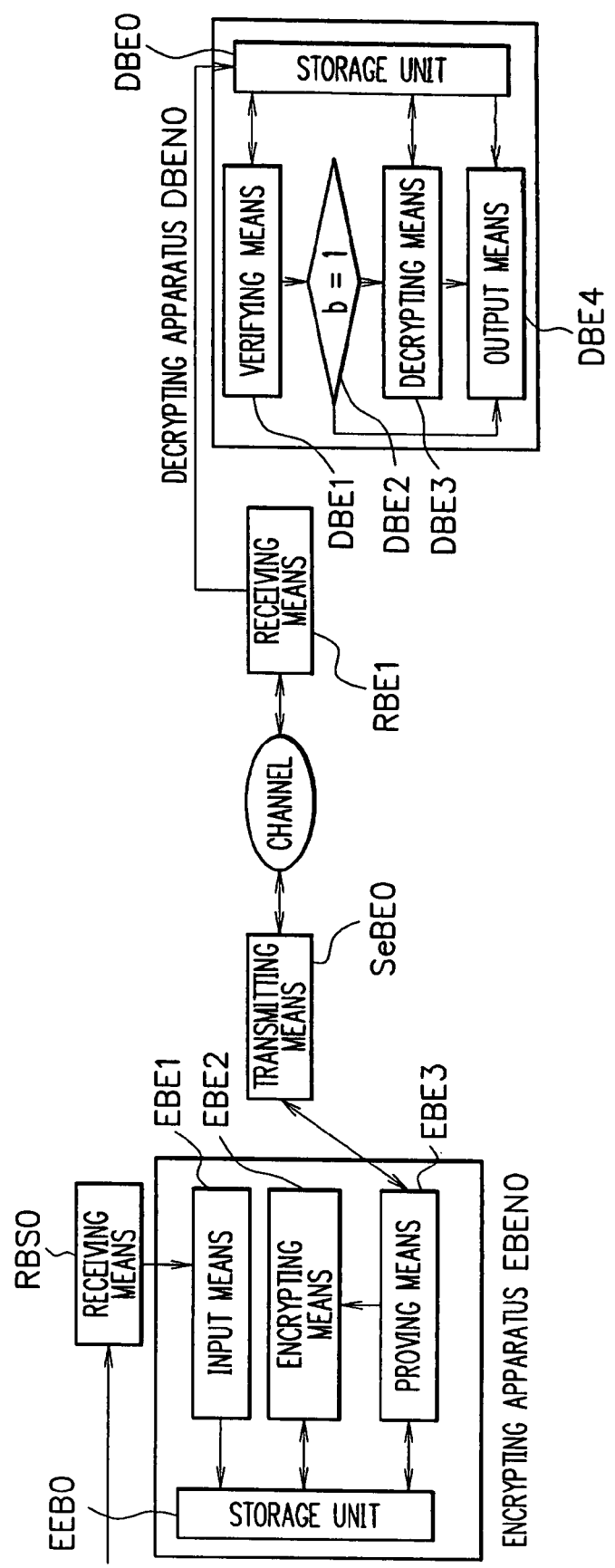
FIG. 14 is a block diagram illustrating configuration of an encrypting apparatus and a decrypting apparatus.

SBN0: signature apparatus
SB0: storage unit
SB1: input unit
SB2: committed vector selecting unit
SB3: first commitment calculating unit
SB4: basis vector calculating unit
SB5: second commitment calculating unit
SB6: vector challenge calculating unit
SB7: vector response calculating unit
SB8: signature text output unit
VBN0: verifying apparatus
VB0: storage unit
VB1: input unit
VB2: basis vector calculating unit
VB3: vector challenge calculating unit
VB4: first validity verifying unit
VB5: second validity verifying unit
VB6: output unit

The invention claimed is:

1. A signature apparatus for generating a signature text by using a commitment, wherein the commitment is a hash value of a set including a value to be committed, data including a pair of elements of a cyclic group associated with a discrete logarithm problem which is used as a public key, and a discrete logarithm of an order of the pair which is used as a secret key, the signature apparatus comprising:

a committed vector selecting unit configured to select a committed vector associated with a first commitment;
a first commitment calculating unit configured to calculate the first commitment;
a basis vector calculating unit configured to calculate a basis vector;
a second commitment calculating unit configured to calculate a power residue and calculates a second commitment;
a vector challenge calculating unit configured to calculate a vector challenge;
a vector response calculating unit configured to calculate a vector response by using the first commitment, a set used for calculating the power residue, the vector challenge, and the basis vector; and
a memory configured to store the committed vector, the first commitment, the basis vector, the second commitment, the vector challenge, and the vector response,
wherein a signature text is generated based in part on the first commitment, the second commitment, and the vector response, and wherein a signature text output means is configured to read the signature text from the memory and output the signature text to a verifying apparatus,
wherein the basis vector and the vector challenge are hash values,
wherein the committed vector selecting unit is further configured to select a plurality of committed vectors, each having the same configuration as the committed vector, and
wherein each component of the plurality of committed vectors and the secret key satisfy a relation equation, and
wherein the first commitment is a hash value of data including components of the vector response, the public key which is data including a pair of elements of the cyclic group associated with the discrete logarithm problem, and the secret key which is a discrete logarithm of an order of the pair.

2. The signature apparatus according to claim 1, wherein each component of the plurality of committed vectors and the secret key satisfy the relation equation with a group order as a modulus, and
wherein the set is data calculated by using a portion of data selected by the committed vector selecting unit, the basis vector, and the vector challenge.

3. The signature apparatus according to claim 2, wherein each component of the committed vectors and the secret key satisfy a linear equation with the group order as a modulus,
wherein an input of the first commitment is data including a random number,
wherein a portion of the data is determined by the vector challenge, and
wherein the set is represented by a linear equation of the portion of the data and the basis vector.

4. The signature apparatus according to claim 3, wherein the committed vector includes two components, one component being a value obtained by adding a secret key to the other component and obtaining a residue with a group order as a modulus,
wherein an input to the first commitment includes data for specifying each component of the committed vector, and
wherein the set is an inner product of the portion of the data and the basis vector.

5. The signature apparatus according to claim 4, assuming that security parameters are κ, N, and ν, and an order of the cyclic group is q, wherein the committed vector selecting unit is configured to select a residue group $X\_\{01\}, \ldots, X\_\{0N\} \in (Z/qZ)$ at random and set values obtained by adding x to the residue group $X\_\{0j\}$ for $j=1, \ldots N$ and obtain a residue with the order q as a modulus to $X\_\{1j\}$, wherein the committed vector for $i=0, 1$ is $Y\_i = (X\_\{i1\}, \ldots, X\_\{iN\})$, wherein the first commitment calculating unit is configured to select at random a bit column r of vbits, wherein a hash value of data including the public key, $X\_\{ij\}$, i, j, r for $i=0, 1$ is set to a first commitment $C\_\{ij\}$, wherein the basis vector calculating unit is configured to select a hash value of data including the public key and the first commitment $C\_\{ij\}$ to the basis vector $V = (u\_1, \ldots, u\_N)$, wherein the second commitment calculating unit is configured to select an inner product of the basis vector V and the $Y\_0$ and calculate a second commitment $G = g^\{X\}$, wherein the vector challenge calculating unit is configured to select a hash value $K = (c\_1, \ldots, c\_N)$ of data including the public key, $\{C\_\{ij\}\}$, G, r, and a message received by signature apparatus, wherein the vector response calculating unit is configured to select the vector response $\xi\_\{j\} = X\_\{c\_jj\}$ for all $j = 1, \ldots, N$ and $\Xi = (\xi\_1, \ldots, \xi\_\kappa)$, and wherein a signature text $(r, \{C\_\{ij\}\}, G, \Xi)$ is output.

6. The signature apparatus according to claim 1, wherein the relational equation satisfies a linear equation of each of the plurality of vectors and the secret key, and an input of the first commitment is data including a random number.

7. The signature apparatus according to claim 6, wherein the plurality of committed vectors include a plurality of components, wherein one component is obtained by adding a secret key to another component, and wherein an input of the first commitment includes data for specifying each of the components and data specifying which is the ordinal number of the component.

8. The signature apparatus according to claim 7, wherein assuming that security parameters are $\kappa$, N, and $\nu$, and an integer set $R\{\kappa+\xi\}$ satisfies $0 \leq R\{\kappa+\xi\} < 2^\{\kappa+\xi\}$, wherein the committed vector selecting unit is configured to select a residue group $X\_\{01\}, \ldots, X\_\{0N\} \in (Z/qZ)$ at random and set values obtained by adding x to the residue group $X\_\{0j\}$ for $j=1, \ldots N$ to $X\_\{1j\}$, wherein the committed vector for $i=0, 1$ is $Y\_i = (X\_\{i1\}, \ldots, X\_\{iN\})$, wherein the first commitment calculating unit is configured to select at random a bit column r of vbits, wherein a hash value of data including the public key, $X\_\{ij\}$, i, j, r for $i=0, 1$ is set to the first commitment $C\_\{ij\}$, wherein the basis vector calculating unit is configured to set a hash value of data including the public key and the first commitment $C\_\{ij\}$ to the basis vector $V = (u\_1, \ldots, u\_N)$, wherein the second commitment calculating unit is configured to calculate an inner product of the basis vector V and the $Y\_0$ and calculates a second commitment $G = g^\{X\}$, wherein the vector challenge calculating unit is configured to calculate a hash value $K = (c\_1, \ldots, c\_N)$ of data including the public key, $\{C\_\{ij\}\}$, G, r, and a message received by signature apparatus, wherein the vector response calculating unit is configured to calculate the vector response $\xi\_\{j\} = X\_\{c\_jj\}$ for all $j = 1, \ldots, N$ and $\Xi = (\xi\_1, \ldots, \xi\_\kappa)$, and wherein a signature text $(r, \{C\_\{ij\}\}, G, \Xi)$ is output.

9. The signature apparatus according to claim 2, wherein each component of the committed vectors and the secret key satisfy a linear equation with a group order as a modulus, wherein the first commitment is data including a random number, wherein the portion of the data is determined by the vector challenge, and wherein the set is represented by a linear equation of the portion of the data and the basis vector.

10. The signature apparatus according to claim 9, wherein the one component of the committed vector is a value obtained by adding a secret key to another component and obtaining a residue with a group order as a modulus, wherein the set is an inner product of the portion of the data and the basis vector, and wherein the basis vector is a value obtained by multiplying a predetermined number t with $(1, t^1, t^2, \ldots, t^N)$.

11. The signature apparatus according to claim 10, wherein assuming that the message is M, wherein the committed vector selecting unit is configured to select at random $Y\_0 = (X\_\{01\}, \ldots, X\_\{0N\}) \in Zq^\{N\}$, calculate $X\_\{1j\} = x + X\_\{0j\} \bmod q$ for $j = 1, \ldots, N$, and generates the committed vector $Y\_1 = (X\_\{11\}, \ldots X\_\{1N\})$, wherein the second commitment calculating unit is configured to calculate $X = <\{Y\_0, V\}> = \Sigma\_j X\_\{0j\} 2^\{j-1\} \bmod q$ and calculate the commitment $G = g^\{X\}$, wherein the first commitment calculating unit is configured to select at random $r\_\{ij\} \in \{0, 1\}^\{v\}$ for each i and j and calculate the first commitment $C\_\{ij\} = H\_\{\{0, 1\}^v\}(X\_\{ij\}, r\_\{ij\})$ of the $X\_\{ij\}$, wherein the vector challenge calculating unit is configured to calculate $K = (c\_\{1\}, \ldots, c\_\{N\}) = H\_\{\{0, 1\}^\{N\}\}(g, h, \{C\_\{ij\}\}, G, M)$, wherein the vector response calculating unit is configured to calculate the vector response $\xi\_j = X\_\{c\_jj\} \bmod q$ for each j and calculate $\Xi = (\xi\_\{1\}, \ldots, \xi\_\{N\})$, and wherein a signature text $(\{C\_\{ij\}\}, \{r\_\{c\_jj\}\}, G, \Xi)$ is output.

12. The signature apparatus of claim 4, wherein an associated proving apparatus is configured to determine a validity of a proof text.

13. The signature apparatus of claim 7, wherein an associated proving apparatus is configured to determine a validity of a signature text.

14. The signature apparatus of claim 10, wherein an associated proving apparatus is configured to determine a validity of a signature text.

15. The signature apparatus of claim 4, wherein an associated proving apparatus is configured to determine a validity of the public key in a verifying apparatus using a verifier-designated proving scheme, wherein the public key of the verifying apparatus includes two data, the first data and the second data belong to the same cyclic group, and a secret key of a verifier or a portion thereof is obtained by designating the first data to an order and designating the second data to a discrete logarithm, and wherein the signature text generated by the signature apparatus is used as a proof text or a portion thereof for determining validity.

16. The signature apparatus of claim 7, wherein an associated proving apparatus is configured to determine a validity of the public key in the verifying apparatus using a verifier-designated proving scheme,
  wherein the public key of the verifying apparatus includes two data, the first data and the second data belong to the same cyclic group, a secret key of a verifier or a portion thereof is obtained by designating the first data to an order and designating the second data to a discrete logarithm, and
  wherein the signature text generated by the signature apparatus is used as a proof text or a portion thereof for determining validity.

17. The signature apparatus of claim 10, wherein an associated proving apparatus is configured to determine a validity of the public key in a verifying apparatus using a verifier-designated proving scheme,
  wherein the public key of the verifying apparatus includes two data, the first data and the second data belong to the same cyclic group, a secret key of a verifier or a portion thereof is obtained by designating the first data to an order and designating the second data to a discrete logarithm, and
  wherein the signature text generated by the signature apparatus is used as a proof text or a portion thereof for determining validity.

18. The signature apparatus of claim 4, wherein an associated encrypting apparatus is configured to use the signature text as a proof text or a portion thereof for proving knowledge of a random number used to generate a cipher text.

19. The signature apparatus of claim 7, wherein an associated encrypting apparatus is configured to use the signature text as a proof text or a portion thereof for proving knowledge of a random number used to generate a cipher text.

20. The signature apparatus of claim 10, wherein an associated encrypting apparatus is configured to use the signature text as a proof text or a portion thereof for proving knowledge of a random number used to generate a cipher text.

21. A verifying method for determining validity of input data, comprising:
  receiving, via a receiving device, input data including a message and signature text associated with the message, wherein the signature text is based in part on a first commitment, a second commitment, and a vector response;
  verifying a validity of the signature text via processes conducted by a basis vector calculating unit, a vector challenge calculating unit, a first validity verifying unit, a second validity verifying unit, and an output unit, including:
    calculating, by the basis calculating unit, a basis vector and storing the basis vector in a storage unit;
    calculating, by the vector challenge calculating unit, a vector challenge and storing the vector challenge in the storage unit;
    determining, by the first validity verifying unit, a validity of the first commitment by inputting a portion of the input data including the vector response to a hash function; and
    calculating power residue and determining a validity of the vector response,
      wherein the basis vector and the vector challenge are hash values, and
      wherein, the first commitment is a hash value of data including components of the vector response, a public key which is data including a pair of elements of a cyclic group associated with a discrete logarithm problem, and a secret key which is a discrete logarithm of an order of the pair.

22. The verifying method according to claim 21, further comprising:
  determining that the first commitment is valid if the calculated hash value is equal to the first commitment,
  calculating, when to-be-determined data includes data called the second commitment and the vector response and the public key includes two elements of the cyclic group associated with a discrete logarithm problem, first and second power residues that are power residues of the elements and determining whether or not the first power residue is equal to a value obtained by multiplying the second power residue with the second commitment,
    wherein the first power residue is obtained by designating elements which are a portion of the public key to an order and designating a Schnorr challenge to a set, and
    wherein the second power residue is obtained by designating elements which are a portion of the public key to an order and designating a Schnorr response to a set, and
    wherein the Schnorr challenge is data calculated by using the vector challenge and the basis vector, and the Schnorr response is data calculated by using the vector response and the basis vector.

23. The verifying method according to claim 22,
  wherein, if a valid signature text is not included in data selected at random by a signature apparatus, the data is not accepted,
  wherein the data selected at random is input to each hash function,
  wherein one component of the vector response is input to each of the hash functions,
  wherein the Schnorr challenge is a linear equation of the vector challenge and a linear equation of the basis vector, and
  wherein the Schnorr response is a linear equation of the vector response and a linear equation of the basis vector.

24. The verifying method according to claim 23, wherein the Schnorr challenge is an inner product of the vector challenge and the basis vector, and the Schnorr response is an inner product of the vector response and the basis vector.

25. The verifying method according to claim 24, wherein assuming that the message is M, and the to-be-determined data is $(r, \{C\_\{ij\}\}, G, \Xi)$, the method further comprises:
  calculating a hash value of data including the public key and $\{C\_\{ij\}\}$, the hash value being the basis vector $V = (u\_1, \ldots, u\_N)$,
  calculating a hash value of data including the public key, $\{C\_\{ij\}\}$, G, r, and M, and the hash value is the vector challenge $K = (c\_1, \ldots, c\_N)$,
  determining that $C\_\{c\_jj\}$ is valid only if $C\_\{c\_jj\}$ for $j = 1, \ldots, N$ are equal to the hash function and determines that $\{C\_\{jj\}\}$ is valid only if all the $C\_\{c\_jj\}$ are valid, wherein the hash function is a hash value of data including the public key, $\xi\_\{j\}$, $c\_j$, j, and r, and
  determining whether or not $g\^\{<V, \Xi<\} = h\^\{<V, K>\}G$ is satisfied and determining that the signature text is valid if $g\^\{<V, \Xi>\} = h\^\{<V, K>\}G$ is satisfied.

26. The verifying method according to claim 21,
  wherein the signature text is accepted only if the validity is authenticated.

27. The verifying method according to claim 26, further comprising:
  determining, if a hash value obtained by inputting a portion of the input data to a hash function is equal to the first commitment, that the first commitment is valid, and
  using the data input to the hash function to calculate two power residues, and determining whether or not the one of the two power residues is equal to a value obtained by multiplying the other power residue with the second commitment,
    wherein to-be-determined data includes the second commitment and the vector response, the public key includes elements of a cyclic group associated with a discrete logarithm problem,
    wherein each of the power residues is obtained by designating the other element which is a portion of the public key to an order and designating a Schnorr challenge to a set,
    wherein the Schnorr challenge is calculated by using the vector challenge and the basis vector, and
    wherein the Schnorr response is calculated by using the vector response and the basis vector.

28. The verifying method according to claim 27, further comprising:
  rejecting the data if data to be selected at random is not included in a case where the signature apparatus generates a signature text validly;
  inputting the data to be selected at random to each of the hash functions calculated; and
  inputting one component of the vector response to each of the hash functions,
    wherein the Schnorr challenge is a linear equation of the vector challenge and a linear equation of the basis vector, and wherein the Schnorr response is a linear equation of the vector response and a linear equation of the basis vector.

29. The verifying method according to claim 28,
  wherein the Schnorr challenge is an inner product of the vector challenge and the basis vector, and the Schnorr response is an inner product of the vector response and the basis vector.

30. The verifying method according to claim 29, wherein assuming that the message is M, and the to-be-verified signature text is ($\{C\_\{ij\}\}$, $\{r\_\{cjj\}\}$, G, $\Xi$, the method further comprises:
  calculating $K = (c\_\{1\}, \ldots, c\_\{N\}) = H\_\{\{0,1\}^\{N\}\}(g, h, \{C\_\{ij\}\}, G, M)$,
  determining whether or not $C\_\{c\_{jj}\} = H\_\{\{0,1\}^v\}(\xi\_j, r\_\{c\_{jj}\})$ for all $j = 1, \ldots, N$ is satisfied, and if the relation for all j is satisfied, it is determined to be $b = 1$, and if not, it is determined to be $b = 0$,
  when $b = 0$, determining whether or not $g^\{<V, \Xi>\} = h^\{<V, K>\}G$ is satisfied,
  if $g^\{<V, \Xi>\} = h^\{<V, K>\}G$ is not satisfied, $b = 0$ is designated, and data indicating that the signature text is rejected is output, and
  if $g^\{<V, \Xi>\} = h^\{<V, K>\}G$ is satisfied, $b = 1$ is designated, and data indicating that the signature text is accepted is output.

31. The verifying method according to claim 24, wherein a verifying apparatus verifies a validity of a proof text for the public key of a verifier-designated proving scheme verifying apparatus.

32. The verifying method according to claim 29, wherein a verifying apparatus verifies a validity of a proof text for the public key of a verifier-designated proving scheme verifying apparatus.

33. The verifying method of claim 24, further comprising verifying a proof text included as a portion of a cipher text in a decrypting apparatus.

34. The verifying method of claim 29, further comprising verifying a proof text included as a portion of a cipher text in a decrypting apparatus.

* * * * *